(12) United States Patent
Huang et al.

(10) Patent No.: US 12,143,246 B2
(45) Date of Patent: Nov. 12, 2024

(54) METHODS, REMOTE RADIO UNITS AND BASE BAND UNITS OF A DISTRIBUTED BASE STATION SYSTEM FOR HANDLING UPLINK SIGNALS

(71) Applicant: Telefonaktiebolaget LM Ericsson (publ), Stockholm (SE)

(72) Inventors: Yezi Huang, Täby (SE); Miguel Berg, Sollentuna (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 428 days.

(21) Appl. No.: 17/416,138

(22) PCT Filed: Dec. 19, 2018

(86) PCT No.: PCT/SE2018/051344
§ 371 (c)(1),
(2) Date: Jun. 18, 2021

(87) PCT Pub. No.: WO2020/130895
PCT Pub. Date: Jun. 25, 2020

(65) Prior Publication Data
US 2022/0070027 A1    Mar. 3, 2022

(51) Int. Cl.
*H04L 25/02* (2006.01)
*H04B 1/40* (2015.01)
(Continued)

(52) U.S. Cl.
CPC .......... *H04L 25/0242* (2013.01); *H04B 1/40* (2013.01); *H04B 7/0857* (2013.01);
(Continued)

(58) Field of Classification Search
None
See application file for complete search history.

(56) References Cited

U.S. PATENT DOCUMENTS 11,336,413 B2 *   5/2022   Kim ................... H04L 27/2695
2002/0114269 A1 *  8/2002   Onggosanusi ........ H04L 1/0618
                                                            370/208
(Continued)

FOREIGN PATENT DOCUMENTS

CN         101072217 A  * 11/2007   ........ H03M 13/2717
CN         101087170 A  * 12/2007
(Continued)

OTHER PUBLICATIONS

Author Unknown, "Technical Specification Group Radio Access Network; Evolved Universal Terrestrial Radio Access (E-UTRA); Physical channels and modulation (Release 15)," Technical Specification 36.211, Version 15.3.0, 3GPP Organizational Partners, Sep. 2018, 237 pages.

(Continued)

*Primary Examiner* — Andrew C Oh
(74) *Attorney, Agent, or Firm* — Withrow & Terranova, PLLC

(57) ABSTRACT

Disclosed is a method performed by a RRU of a distributed base station system of a wireless communication network, the RRU being connected to a BBU over a fronthaul link, the RRU being connected to N antennas. The method comprises obtaining uplink signals as received at the antennas from UEs wirelessly connected to the RRU, and obtaining a channel estimation matrix of wireless communication channels between UEs and the antennas. The method further comprises determining an error estimation matrix based on the channel estimation matrix, and on received reference signals $y_{ref,l}$, the received reference signals having L symbols, L being smaller than N, determining intermediate signals, based on the uplink signals, the channel estimation matrix and the error estimation matrix, and sending to the (Continued)

BBU over the fronthaul link, the determined intermediate signals.

16 Claims, 8 Drawing Sheets

(51) Int. Cl.
  *H04B 7/08* (2006.01)
  *H04J 11/00* (2006.01)
  *H04W 88/08* (2009.01)
(52) U.S. Cl.
  CPC ......... *H04J 11/004* (2013.01); *H04J 11/0059* (2013.01); *H04L 25/0256* (2013.01); *H04W 88/085* (2013.01)

(56) References Cited

U.S. PATENT DOCUMENTS

| | | | |
|---|---|---|---|
| 2002/0181390 A1* | 12/2002 | Mody | H04L 27/2602 370/208 |
| 2003/0021335 A1* | 1/2003 | De | H04B 1/7105 375/147 |
| 2003/0092447 A1* | 5/2003 | Bottomley | H04L 25/0224 455/522 |
| 2003/0101387 A1* | 5/2003 | Lee | H04L 1/0025 714/704 |
| 2007/0041404 A1* | 2/2007 | Palanki | H04W 72/20 370/479 |
| 2007/0060178 A1* | 3/2007 | Gorokhov | H04L 5/1438 455/506 |
| 2007/0127588 A1* | 6/2007 | Kim | H04B 7/04 375/267 |
| 2007/0183537 A1* | 8/2007 | Matsumoto | H04L 25/03038 375/340 |
| 2008/0123540 A1* | 5/2008 | Mantravadi | H04B 1/1027 370/252 |
| 2008/0125052 A1* | 5/2008 | Byun | H04L 1/20 455/67.13 |
| 2008/0130803 A1* | 6/2008 | Chang | H04B 7/0413 375/346 |
| 2008/0267262 A1* | 10/2008 | Cairns | H04B 1/71055 375/148 |
| 2008/0267265 A1* | 10/2008 | Cairns | H04B 1/7107 375/150 |
| 2008/0299981 A1* | 12/2008 | Foschini | H04W 52/267 455/446 |
| 2010/0303182 A1* | 12/2010 | Daneshrad | H04B 1/7102 455/63.1 |
| 2011/0170631 A1* | 7/2011 | Kim | H04B 7/04 375/296 |
| 2014/0233457 A1* | 8/2014 | Koutsimanis | H04L 5/0073 370/328 |
| 2016/0020882 A1* | 1/2016 | Shimezawa | H04L 5/0053 370/330 |
| 2016/0149726 A1* | 5/2016 | Hombs | H04L 25/03006 370/252 |
| 2016/0294514 A1* | 10/2016 | Tang | H04W 76/14 |
| 2017/0034725 A1* | 2/2017 | Negishi | H04B 17/318 |
| 2017/0180053 A1* | 6/2017 | Lozhkin | H04B 10/25753 |
| 2017/0202014 A1* | 7/2017 | Moon | H04B 7/0626 |
| 2017/0373890 A1* | 12/2017 | Fertonani | H04L 9/40 |
| 2018/0020466 A1* | 1/2018 | Wang | H04W 72/569 |
| 2018/0034532 A1 | 2/2018 | Wu | |
| 2018/0054290 A1* | 2/2018 | Park | H04W 72/21 |
| 2018/0062696 A1* | 3/2018 | Kawasaki | H04B 1/50 |
| 2018/0159611 A1* | 6/2018 | Majmundar | H04L 47/38 |
| 2018/0234153 A1* | 8/2018 | Lincoln | H04W 52/0274 |
| 2018/0248720 A1* | 8/2018 | Park | H04B 7/0626 |
| 2018/0287673 A1 | 10/2018 | Chang et al. | |
| 2022/0217018 A1* | 7/2022 | Huang | H04B 17/309 |

FOREIGN PATENT DOCUMENTS

| | | | | |
|---|---|---|---|---|
| CN | 101273551 A | * | 9/2008 | ......... H04B 1/7107 |
| CN | 101867462 A | * | 10/2010 | |
| CN | 102035589 A | * | 4/2011 | |
| CN | 104782065 A | | 7/2015 | |
| CN | 106470054 A | | 3/2017 | |
| CN | 107113105 B | * | 1/2020 | ............... H04L 1/06 |
| CN | 106470054 B | * | 3/2020 | ........... H04B 7/0413 |
| CN | 109660324 B | * | 1/2021 | ............. H04L 27/26 |
| CN | 112425079 A | * | 2/2021 | ............. H04B 1/406 |
| DE | 60214061 T2 | * | 1/2007 | ............. H04L 1/005 |
| DE | 102018220130 A1 | * | 8/2019 | ........... H04B 17/318 |
| EP | 1793510 A2 | * | 6/2007 | ........ H04B 7/15585 |
| EP | 1931075 A1 | * | 6/2008 | ............ H04L 1/0631 |
| EP | 3531736 B1 | * | 3/2021 | ........... H04L 1/0026 |
| JP | 2011155700 A | * | 8/2011 | ........ H04B 7/15585 |
| WO | WO-2018128340 A1 | * | 7/2018 | ........... H04B 7/0626 |

OTHER PUBLICATIONS

Golub, Gene H., et al., "Matrix Computations," 4th edition, The Johns Hopkins University Press, Baltimore, 2013, 780 pages.

Holmes, Michael P., et al., "Fast SVD for Large-Scale Matrices," ResearchGate, Jan. 2007, 2 pages, URL: https://www.researchgate.net/publication/228820785_Fast_SVD_for_large-scale_matrices.

Huang, Yezi, et al., "Functional Split of Zero-Forcing Based Massive MIMO for Fronthaul Load Reduction," IEEE Access, vol. 6, Jan. 1, 2018, pp. 6350-6359.

Hunger, Raphael, "Floating Point Operations in Matrix-Vector Calculus (Version 1.3)," Technical Report, Technische Universitat Munchen, Sep. 2007, 16 pages.

International Search Report and Written Opinion for International Patent Application No. PCT/SE2018/051344, mailed Jul. 9, 2019, 9 pages.

First Office Action for Chinese Patent Application No. 201880100380.2, mailed Sep. 5, 2023, 8 pages.

Notification to Grant for Chinese Patent Application No. 201880100380.2, mailed Feb. 5, 2024, 6 pages.

* cited by examiner

METHODS, REMOTE RADIO UNITS AND BASE BAND UNITS OF A DISTRIBUTED BASE STATION SYSTEM FOR HANDLING UPLINK SIGNALS

TECHNICAL FIELD

The present disclosure relates generally to methods, remote radio units, and base band units of distributed base stations, for handling uplink signals. More specifically, the present disclosure deals with such methods and units when the remote radio unit has a plurality of antennas for receiving uplink signals, such as in MIMO systems. The present disclosure further relates to computer programs and carriers corresponding to the above methods and units.

BACKGROUND

In a centralized radio access network (C-RAN), also called a distributed base station system, radio access network (RAN), processing is conducted by two separate units: a remote radio unit (RRU), and a base band unit (BBU). The BBU is connected to the RRU via a fronthaul link. The RRU is connected to one or more antennas through which the RRU wirelessly communicates with at least one user equipment (UE). The BBU is in its turn connected to other base station systems or base stations, and to a core network of a wireless communication system. The BBU is centralized and there may be more than one RRU connected to each BBU. Traditionally, the BBU performs advanced radio coordination features such as joint detection, joint decoding, coordinated multi-point transmission (COMP), to increase the spectrum efficiency and network capacity, as well as baseband processing, whereas the RRUs perform radio frequency (RF) processing and transmission/reception of the RF processed signals. Such a split of base station functionality between BBU and RRU is called a physical layer-radio frequency (PHY-RF) split.

Originally, the RRU was designed to reduce the cable loss of the coax cables between an antenna tower top where the actual antennas are situated and the bottom of the antenna tower where the base station functionality is hosted. Therefore, before $5^{th}$ Generation of mobile communication (5G), i.e. at 4G, e.g. Long Term Evolution (LTE), the RRU was rather simple and was mainly doing RF processing with limited baseband processing, if any.

When going from 4G to 5G, there is a need to increase the wireless communication capacity towards the UEs in order to be able to deliver requested data amounts per time period in 5G. One enabler of the mobile evolution towards 5G is massive Multiple Input Multiple Output (MIMO) in which each RRU has a plurality of antennas. In other words, massive MIMO exploits spatial multiplexing to improve spectrum efficiency by using antenna arrays at the RRU, which antenna array is equipped with N antennas simultaneously serving K user-layers in the same time-frequency resource. The typical scenario is N>>K. e.g., N is 64, 128 or 256 while K is 8 or 16. As shown, the number of antennas are quite large. Massive MIMO is often referred to as massive beamforming, which is able to form narrow beams and focus on different directions. It also benefits multi-user MIMO, which allows the transmissions from/to multiple UEs simultaneously over separate spatial channels resolved by the massive MIMO technologies, while keeping high capacity for each UE. To support such massive MIMO solutions, the required fronthaul link capacity needs to increase in proportion to the increase of number of antennas, when using the current PHY-RF split between functionality of BBU and RRU. This will dramatically drive up the fronthaul link costs.

To reduce the required fronthaul (FH) capacity, new functional splits within the physical layer (PHY) are discussed and proposed. Basically, some baseband PHY functions will be moved to the RRU, which mainly performs RF-related operations in the current Common Public Radio Interface (CPRI) based implementation. Two options for intra-PHY split have attracted attention.

Option 1: transport frequency-domain samples in FH, instead of transporting time-domain samples in CPRI. In this option, RRU needs to perform FFT/IFFT operations to transform between time domain and frequency domain samples. Here, option 1 is referred to as frequency domain FH (fdFH). In fdFH, the number of FH streams still equals to the number of antennas. One advantage of fdFH is the possibility that fdFH traffic is proportional to the air interface traffic load. The required peak capacity is still high when traffic is fully loaded.

Option 2: transport layer samples in FH. It means the MIMO or beamforming processing is done in the RRU. The number of FH streams are reduced to the number layers. For example, if the system is N=64 antennas and K=16 user layers, there are only 16 FH streams going through the FH link. Here option 2 is referred to as layer FH (laFH). This can dramatically reduce the required FH capacity, which is also proportional to traffic load. However, moving the whole MIMO or beamforming processing to RRU increases significantly the complexity of RRU. The system is not scalable to support more antennas. It needs to replace the existing RRU to support more antennas. It also limits the joint-MIMO-processing possibility for coordinating multiple RRUs at different places.

Consequently there is a need to find solutions that balances the complexity of the RRU to the capacity limitations on the fronthaul.

In "Functional Split of Zero-Forcing Based Massive MIMO for Fronthaul Load Reduction," by Y. Huang, C. Lu, M. Berg and P. Odling, published in IEEE Access, vol. 6, pp. 6350-6359, 2018, an intra-PHY functional split scheme between BBU and RRU regarding uplink is proposed. Instead of moving all MIMO/beamforming processing to RRU, the MIMO processing is decomposed to two parts. The first part requiring lower complexity is implemented in the RRU, while the second part requiring higher complexity is implemented in the BBU. The proposed intra-PHY functional split takes advantage of a formation feature of a known Zero-forcing (ZF) method and separates the MIMO processing into a maximum ratio combining (MRC) part and an interference-cancellation part. The MRC processing only carries out Hermitian transpose of the estimated channel. This is computationally light and therefore the MRC processing is moved to the RRU. The interference cancellation part contains matrix inversion, which is computationally heavy, is instead carried out in the BBU. This scheme reduces the number of FH streams to the number of layers and achieve the same performance as an original ZF-based approach when it is implemented totally in RRU. However, the proposed intra-PHY functional split using the ZF-based method does not consider inter-cell interference, i.e. interference from UEs connected to other base stations. Consequently, the performance degrades when strong inter-cell interferences are present.

In uplink MIMO systems, a minimum mean square error-interference rejection combining method (MMSE-IRC) achieves better performance than a ZF-based method, since it also mitigates the co-channel interferences from other cells while cancel the intra-cell interferences. However, the IRC coefficients for an N-antenna base station requires to calculate an N×N matrix inversion plus some other N-dimensional matrix multiplications. So, the complexity is much higher than the ZF-based method which requires a K×K matrix inversion where K is the number of user layers. Consequently, to use an MMSE-IRC based method would dramatically increase the complexity of the RRU. Similar to the ZF-based method when implementing MMSE-IRC in the RRU, the system would not be scalable to support more antennas. Therefore, it would be beneficial also if the IRC processing can be distributed between the RRU and the BBU, instead of having all IRC processing in the RRU. Today, there is no known method for distributing computational functionality between the RRU and the BBU that also handles inter-cell interference.

SUMMARY

It is an object of the invention to address at least some of the problems and issues outlined above. An object of embodiments of the invention is to balance complexity of the RRU to capacity limitations on the fronthaul and at the same time handle inter-cell interference for UL transmissions. It is possible to achieve these objects and others by using methods, network nodes and wireless communication devices as defined in the attached independent claims.

According to one aspect, a method is provided performed by an RRU of a distributed base station system of a wireless communication network. The distributed base station system further comprises a BBU connected to the RRU over a fronthaul link. The RRU is connected to N antennas. The method comprises obtaining uplink signals y as received at the N antennas from a number of UEs wirelessly connected to the RRU, the uplink signals comprising K user-layer signals overlaid with interference signals and noise. The method further comprises obtaining a channel estimation matrix $\hat{H}$ of wireless communication channels H between the number UEs and the N antennas, and determining an error estimation matrix Z based on the obtained channel estimation matrix $\hat{H}$, and on received reference signals $y_{ref,l}$ as received at the N antennas, the received reference signals having L number of symbols. The number of reference symbols is smaller than N. The method further comprises determining intermediate signals $\tilde{y}$, based on the uplink signals y, the channel estimation matrix $\hat{H}$ and the error estimation matrix Z, and sending to the BBU over the fronthaul link, the determined intermediate signals $\tilde{y}$.

According to another aspect, a method is provided performed by a BBU system of a wireless communication network, the wireless communication network comprising a distributed base station system having a BBU and an RRU connected to the BBU over a fronthaul link. The RRU has N antennas. The method comprises receiving, from the RRU, a plurality of intermediate signals $\tilde{y}$ with K+M components, where (K+M) is smaller than N, determined by the RRU based on a channel estimation matrix $\hat{H}$, on an error estimation matrix Z and on uplink signals y with N components as received by the N antennas from a number of UEs, the uplink signals y comprising K user-layer signals overlaid with interference signals and noise. The method further comprises determining an interference rejection matrix $W_K$ based on the channel estimation matrix $\hat{H}$ and on the error estimation matrix Z, and determining an estimation r of the K user-layer signals by multiplying the intermediate signals $\tilde{y}$ with interference rejection coefficients of the interference rejection matrix $W_K$.

According to another aspect, an RRU is provided, which is operable in a distributed base station system of a wireless communication network, the distributed base station system further comprising a BBU connected to the RRU over a fronthaul link. The RRU is connected to N antennas. The RRU comprises a processing circuitry and a memory. Said memory contains instructions executable by said processing circuitry, whereby the RRU is operative for obtaining uplink signals y as received at the N antennas from a number of UEs wirelessly connected to the RRU, the uplink signals comprising K user-layer signals overlaid with interference signals and noise, and for obtaining a channel estimation matrix $\hat{H}$ of wireless communication channels H between the number UEs and the N antennas. The RRU is further operative for determining an error estimation matrix Z based on the obtained channel estimation matrix $\hat{H}$, and on received reference signals $y_{ref,l}$ as received at the N antennas from the number of UEs, the received reference signals having L symbols, L being smaller than N, for determining intermediate signals $\tilde{y}$, based on the uplink signals y, the channel estimation matrix $\hat{H}$ and the error estimation matrix Z, and for sending to the BBU over the fronthaul link, the determined intermediate signals $\tilde{y}$.

According to another aspect, a BBU system is provided, which is operable in a wireless communication network. The wireless communication network comprises a distributed base station system having a BBU and an RRU connected to the BBU over a fronthaul link. The BBU system comprises a processing circuitry and a memory. Said memory contains instructions executable by said processing circuitry, whereby the BBU system is operative for receiving, from the RRU 120, a plurality of intermediate signals $\tilde{y}$ with K+M components, where (K+M) is smaller than N, determined by the RRU based on a channel estimation matrix $\hat{H}$, on an error estimation matrix Z and on uplink signals y with N components as received by the N antennas 121, 122, 123 from a number of UEs 131, 132, 133, the uplink signals y comprising K user-layer signals overlaid with interference signals and noise. The BBU system is further operative for determining an interference rejection matrix $W_K$ based on the channel estimation matrix $\hat{H}$ and on the error estimation matrix Z, and for determining an estimation r of the K user-layer signals by multiplying the intermediate signals $\tilde{y}$ with interference rejection coefficients of the interference rejection matrix $W_K$.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to offload some RRU complexity to the BBU and in at least some embodiments to make an IRC system scalable to support more antennas at the RRUs, while keeping a moderate FH traffic load. Parts of this disclosure presents a method in which the mathematical formulation of the IRC method, as shown further down by equation (1) is reformulated as a ZF (zero-forcing) method of an extended "channel" including interference aspects, and then the ZF process is decomposed into two parts. The first part performs MRC, which is much simpler than the full IRC and is therefore implemented in the RRU. The second part takes remaining calculations, such as matrix inversion, with high complexity and is implemented in the BBU.

Comparing to the CPRI-based FH, the number of required FH streams can be reduced to the number of desired user layers plus the number of the interfering user layers of the co-channel interfering UEs from other cells. This is theoretically sound as the number of the degrees of freedom are reserved to the BBU to mitigate both intra-cell and inter-cell interferences, i.e. the interferences between desired user layers in the same cell and the interferences from the interfering user layers from other cells.

Figure 1:
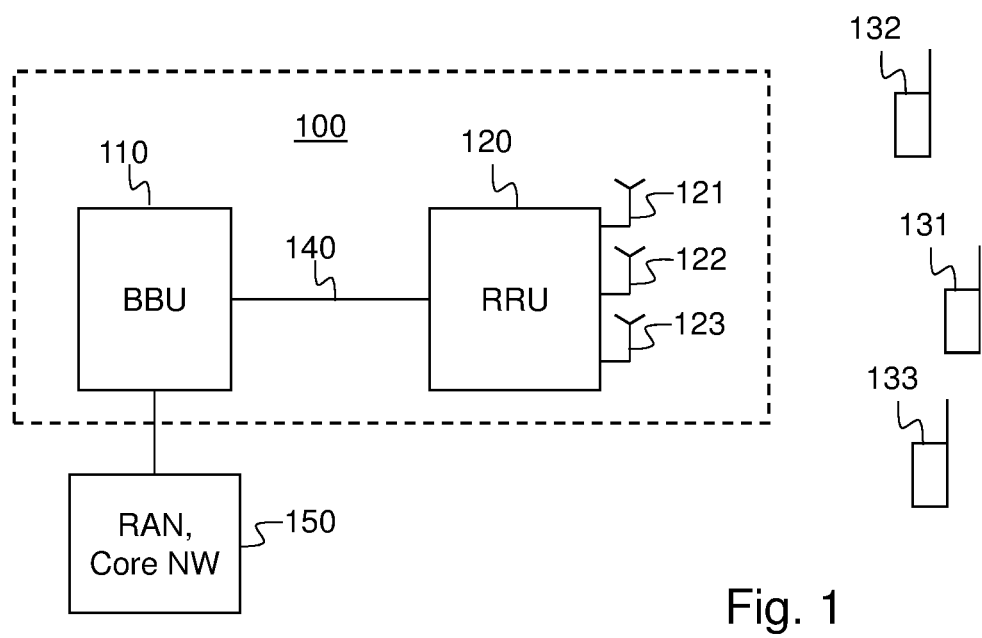
FIG. 1 is a schematic block diagram of a wireless communication system comprising a distributed base station system in which the present invention can be used.

FIG. 1 illustrates a wireless communication network in which the present invention may be used. The wireless communication network comprises a distributed base station system 100, which in turn comprises a BBU 110 and a RRU 120. The BBU 110 has connections to other base station nodes or other RAN nodes and further to a core network (symbolized with 150 in FIG. 1) so that the distributed base station system can communicate to other nodes of the communication network. The BBU is connected with the RRU via a fronthaul link 140. The fronthaul link 140 may be any kind of connection, such as a dedicated wireline or wireless connection or a connection via a network, as long as the connection fulfils fronthaul requirements, e.g. in capacity and latency. The RRU further has a plurality of antennas 121, 122, 123 through which wireless signals are communicated towards and from one or more UEs 131, 132, 133. The wireless signals comprises data to be communicated from or to the UEs 131, 132, 133. The BBU 110 and the RRU 120 comprise RAN functionality for handling the data and signals to be communicated between the RRU 120 and the UEs 131, 132, 133. The RAN functionality is distributed between the BBU and the RRU as will be described further down in this disclosure.

The wireless communication network in which the distributed base station 100 is to be used may be any kind of wireless communication network that can provide radio access to wireless communication devices. Examples of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as fifth generation wireless communication networks based on technology such as New Radio (NR).

The UEs 131, 132, 133 may be any type of communication device capable of wirelessly communicating with the RRU 120 using radio signals. For example, the UEs may be a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
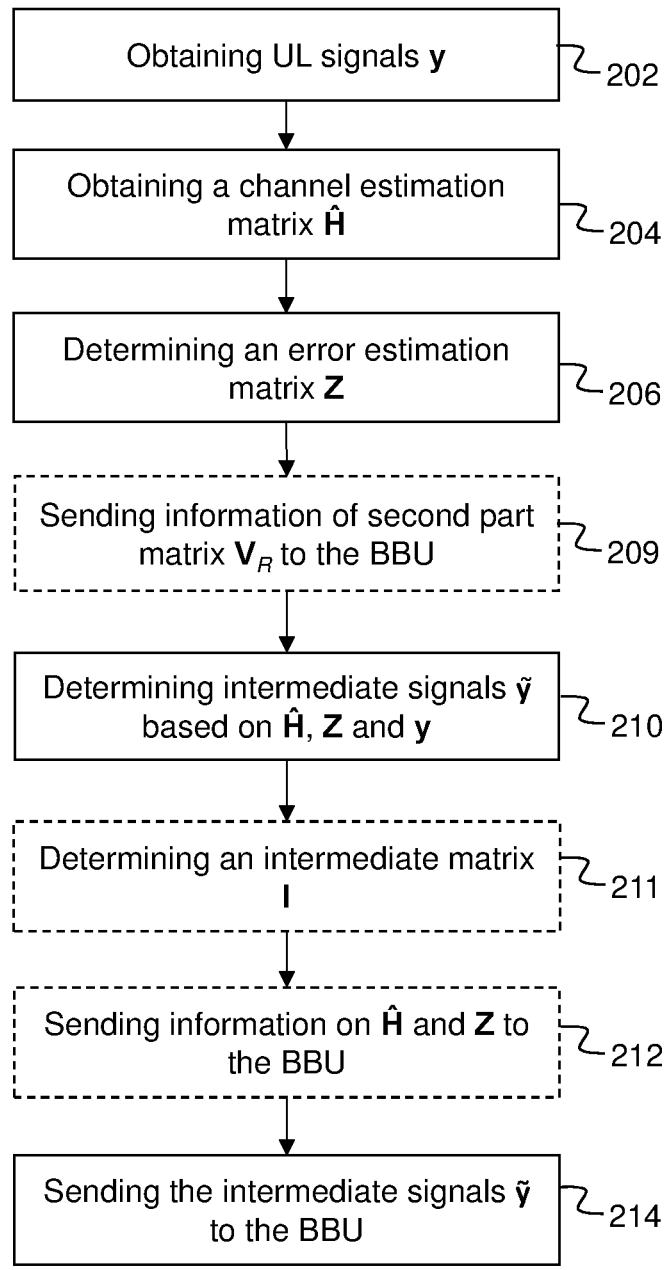
FIG. 2 is a flow chart illustrating a method performed by a RRU, according to possible embodiments.

FIG. 2, in conjunction with FIG. 1, describes a method performed by an RRU 120 of a distributed base station system 100 of a wireless communication network. The distributed base station system 100 further comprises a BBU 110 connected to the RRU over a fronthaul link 140. The RRU 120 is connected to N antennas 121, 122, 123. The method comprises obtaining 202 uplink signals y as received at the N antennas 121, 122, 123 from a number of UEs 131, 132, 133 wirelessly connected to the RRU 120, the uplink signals comprising K user-layer signals overlaid with interference signals and noise. The method further comprises obtaining 204 a channel estimation matrix $\hat{H}$ of wireless communication channels H between the number UEs 131, 132, 133 and the N antennas 121, 122, 123, and determining 206 an error estimation matrix Z based on the obtained channel estimation matrix $\hat{H}$, and on received reference signals $y_{ref,l}$ as received at the N antennas, the received reference signals having L number of symbols. The number of reference symbols is smaller than N. The method further comprises determining 210 intermediate signals $\tilde{y}$, based on the uplink signals y, the channel estimation matrix $\hat{H}$ and the error estimation matrix Z, and sending 214 to the BBU 110 over the fronthaul link 140, the determined intermediate signals $\tilde{y}$.

The "interference signals" are signals originating from UEs wirelessly connected to other base stations or base station systems than this base station system. The K user-layer signals use the same time-frequency resource when transmitted wirelessly from the UEs to the RRU. "N" in "N antennas" are a plurality of antennas. When the invention is of most benefit, the number of antennas "N" is larger than K. The obtained uplink signals y comprises N components. The obtained uplink signals y can be described as $y=[y_1 \ y_2 \ \ldots \ y_N]^T$, where $[y_1 \ y_2 \ \ldots \ y_N]^T$ is the transpose of vector $[y_1 \ y_2 \ \ldots \ y_N]$. The obtained uplink signals y can be modelled as a vector where $y_i$ represents the received signal at the i-th antenna among the N antennas. The fronthaul link 140 may be any kind of connection connecting the RRU to the BBU, such as a dedicated wireline or wireless connection or a connection via a network, as long as the connection fulfils fronthaul requirements, e.g. in capacity and latency. One channel estimation matrix $\hat{H}$ is determined for a limited time period and frequency range. According to an embodiment, the channel is estimated for each resource block (RB). In this embodiment there are many channel estimation matrixes determined, for example, the LTE 20 MHz range has 100 RBs and the NR 100 MHz has 273 RBs. According to an embodiment, the channel estimation matrix is obtained based on knowledge of one or more first reference signals as sent by the number of UEs and on the first reference signal as it looks when received at the N antennas. The received first reference signal is measured when received at each antenna. The channel estimation matrix $\hat{H}$ is then determined based on the measured first reference signal at each antenna and on a knowledge of what the received first reference signal looked like when it was sent from the UEs, aka the sent first reference signal. The difference of the sent first reference signal and the received first reference signal is due to the conditions of the wireless channel between the UEs and the antennas of the RRU, but also due to interference from other UEs belonging to other base stations and due to noise. The wireless communication channel may be estimated by using for example a least-square estimation on the known sent first reference signal and the received first reference signals, if channel distribution and noise distribution is unknown or, if channel and noise distribution is known, by using a Minimum Mean Square Error (MMSE) estimation. Such different methods for obtaining a channel estimation matrix $\hat{H}$ is well-known to a person skilled in the art, for which reason those methods are not further elaborated on here.

The received reference signals $y_{ref,l}$ used for determining the error estimation matrix Z may be described as $y_{ref,l}=[y_{\{ref,l1\}}\ y_{\{ref,l2\}} \ldots y_{\{ref,lN\}}]^T$ where $y_{ref,l}$ represents the l-th received reference symbol at the N antennas, and $y_{\{ref,li\}}$ represents the l-th reference symbol received at the i-th antenna. The error estimation matrix Z is determined based on the received reference signals $y_{ref,l}$, the sent reference signal $x_{ref,l}=[x_{ref,l1}\ x_{ref,l2} \ldots x_{ref,lK}]^T$ (l=1, 2, . . . . L) and the channel estimation matrix $\hat{H}$. This sent reference signals $x_{ref,l}$ and the corresponding received reference signals $y_{ref,l}$ may be the same reference signals as the first reference signals used for determining the channel estimation matrix $\hat{H}$. The intermediate signal $\tilde{y}$ can be modeled as a vector with K+M components, where 1<=M<=L. The intermediate signals $\tilde{y}$ may be described as $\tilde{y}=[\tilde{y}_1\ \tilde{y}_2 \ldots \tilde{y}_{K+M}]^T$, where $\tilde{y}_k$ is the signal transmitted on the k-th fronthaul stream.

By the above method, the amount of data that is sent over the fronthaul link 140 from the RRU 120 to the BBU 110 can be lowered while the most processor-demanding calculations are performed in the BBU 110. The method also takes care of intracell and intercell interferences. The method is especially advantageous when there are a multitude of antennas, and consequently a multitude of antenna signals to be handled in the distributed base station, such as in distributed MIMO.

According to an embodiment, the determining 210 of the intermediate signals $\tilde{y}$ comprises multiplying the received incoming signal y with the transpose and conjugate A* of an extended channel matrix A, which is obtained based on the channel estimation matrix $\hat{H}$ and the error estimation matrix Z. The transpose and conjugate A* of a matrix A could also be called the Hermitian transpose of matrix A. Such a measure can be seen as applying an MRC operation for the extended channel A. The extended channel takes account for the interference, via Z. An MRC operation is fairly non-complex so it does not need very much processing power. The more complex calculations are left for the BBU. The intermediate signal is reduced from N to K+M streams, meaning that the amount of data sent over the fronthaul link 140 is reduced.

According to another embodiment, the error estimation matrix Z is determined as $Z=1/\sqrt{L}[\hat{z}_1 \ldots \hat{z}_L]$, where $\hat{z}_l=y_{ref,l}-\hat{H}x_{ref,l}$ for l=1, . . . , L, wherein $x_{ref,l}$ is the reference signals as sent from the UEs and $y_{ref,l}$ is the corresponding received reference signal.

According to another embodiment, the error estimation matrix Z is decomposed into a first part matrix $G_R$ and a second part matrix $V_R$, wherein the first part matrix $G_R$ composes M column vectors and the second part matrix $V_R$ composes of M column vectors, M being smaller than L. Further, in the determining 210 of the intermediate signals $\tilde{y}$, the extended channel matrix A is obtained by combining the channel estimation matrix $\hat{H}$ and the first part matrix $G_R$. Further, the method comprises sending 209 information of the second part matrix $V_R$ to the BBU. Hereby the number of bits sent over the fronthaul link 140 is reduced even further. The number of fronthaul streams of the intermediate signals $\tilde{y}$ are fewer than when the whole error estimation matrix Z is used to generate y and the reduced version of the intermediate signal added with the information of the second part matrix $V_R$ comprises in total fewer bits than the original version of the intermediate signals $\tilde{y}$. This embodiment is especially of interest when the fronthaul link capacity is highly limited and there is vacant processing power in the RRU. It is also of special interest when L is larger than the number of interfering UEs.

According to an embodiment of the above embodiment, the error estimation matrix Z is approximated as a multiplication of the first part matrix $G_R$ and the transpose and conjugate of the second part matrix $V_R$, which are determined by performing a Singular Value Decomposition (SVD) on samples of the error estimation matrix Z. The M column vectors of $V_R$ are the right-singular vectors corresponding to the M largest singular values of the error estimation matrix Z. In this case, the SVD only needs to be partially calculated, regarding a subset of the strongest singular values. There exist efficient SVD implementations for doing this. As one example, using R-SVD, described in the book of "Matrix computation, G. H. Golub, C. F. Van Loan, 4$^{th}$ edition, 2013, is advantageous at saving complexity. Further, in the determining 210 of the intermediate signals $\tilde{y}$, the extended channel matrix A is the combination of channel estimation matrix $\hat{H}$ and the auxiliary matrix $G_R$, instead of the error estimation matrix Z. In other words, the extended channel matrix A has been changed from [$\hat{H}$ Z] to [$\hat{H}$ $G_R$]. As $G_R$ is smaller than Z with fewer column vectors, less data has to be sent over the fronthaul link. To use an SVD in such a way has proven to be efficient for reducing the dimensions of the error estimation matrix while still keeping the strongest singular values.

According to another embodiment, the method further comprises sending 212, to the BBU 110, information on the obtained channel estimation matrix $\hat{H}$ and the error estimation matrix Z. Hereby, the BBU is informed of the estimations used at the RRU and can use the information to process the received intermediate signal $\tilde{y}$.

Further, according to a variant of this embodiment, the sent 212 information on the obtained error estimation matrix Z and channel estimation matrix Ĥ is the coefficients of an extended channel matrix A, which is obtained based on the channel estimation matrix Ĥ and the error estimation matrix Z.

According to another variant of this embodiment, the method further comprises determining 211 an intermediate matrix I as A*A, wherein A is an extended channel matrix A, which is obtained based on the channel estimation matrix Ĥ and the error estimation matrix Z, and A* is the transpose and conjugate of the extended channel matrix A. Further, the sent 212 information on the obtained error estimation matrix Z and channel estimation matrix Ĥ is the coefficients of the intermediate matrix I. For A being the combination of Ĥ and Z, the determination of I results in (K+L)×(K+L) coefficients. For the embodiment when A is the combination of Ĥ and the first part matrix $G_R$, the determination of I results in (K+M)×(K+M) coefficients. The coefficients of I are sent to the BBU in addition to the intermediate signals ỹ. The number of extra coefficients are lowered from N×(K+L) (or N×(K+M) when $G_R$ is used instead of Z) to (K+L)*(K+L) (or to (K+M)×(K+M) when $G_R$ is used instead of Z) compared to sending the coefficients of the extended channel matrix A. However, an extra computation is performed in the RRU compared to sending A at once. This is advantageous when the fronthaul link 140 capacity is limited, and also for example when transmitting at higher frequency in NR when N normally is much larger than K+L.

Figure 3:
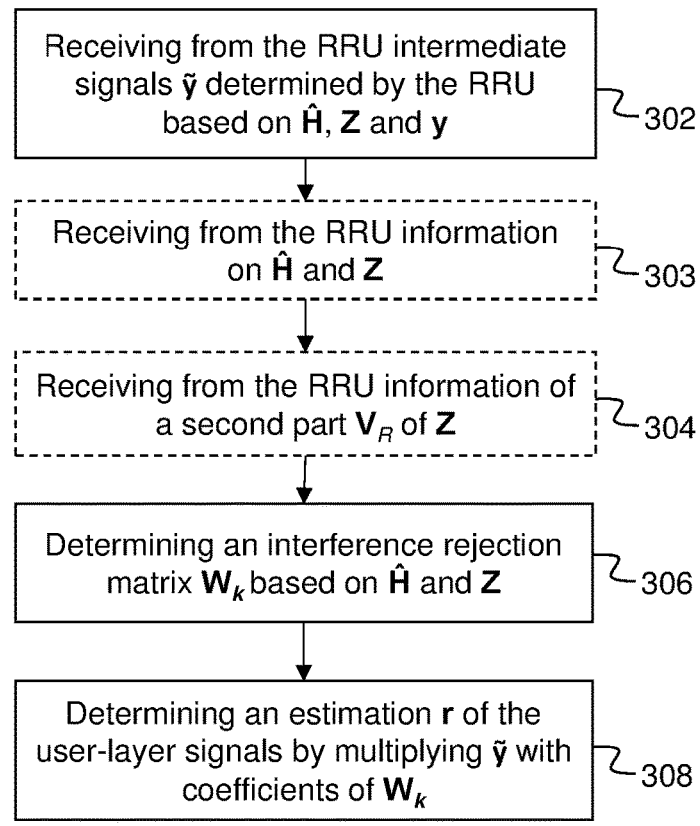
FIG. 3 is a flow chart illustrating a method performed by a BBU, according to possible embodiments

FIG. 3, in conjunction with FIG. 1, describes a method performed by a BBU system of a wireless communication network, the wireless communication network comprising a distributed base station system 100 having a BBU 110 and an RRU 120 connected to the BBU 110 over a fronthaul link 140. The RRU has N antennas 121, 122, 123. The method comprises receiving 302, from the RRU 120, a plurality of intermediate signals ỹ with K+M components, where (K+M) is smaller than N, determined by the RRU based on a channel estimation matrix Ĥ, on an error estimation matrix Z and on uplink signals y with N components as received by the N antennas 121, 122, 123 from a number of UEs 131, 132, 133, the uplink signals y comprising K user-layer signals overlaid with interference signals and noise. The method further comprises determining 306 an interference rejection matrix $W_K$ based on the channel estimation matrix Ĥ and on the error estimation matrix Z, and determining 308 an estimation r of the K user-layer signals by multiplying the intermediate signals ỹ with interference rejection coefficients of the interference rejection matrix $W_K$.

The signal r that is achieved after the multiplication is an estimation of the K user-layer signals with interference mitigated. The signal r is then further treated, such as being sent for demodulation at the BBU. The BBU system of the wireless communication network that performs the method may be the BBU 110. Alternatively, the BBU system may be any other network node of the communication network, such as a node further away from the UE, e.g. another network element in the RAN or close to the RAN or another RAN node. In this alternative, the BBU 110 receives from the RRU 120, the intermediate signals ỹ, and communicates the intermediate signals to the other network node that performs the determining steps. Alternatively, the BBU system may be a group of network nodes, wherein functionality for performing the method are spread out over different physical, or virtual, nodes of the network. The latter may be called a "cloud-solution". By receiving K+M intermediate signals instead of N uplink signals, K+M being smaller than N, fronthaul capacity is saved.

According to an embodiment, the interference rejection matrix $W_K$ is determined 306 as the first K rows of $(A^*A)^{-1}$, where A is an extended channel matrix, which is obtained based on the channel estimation matrix Ĥ and the error estimation matrix Z and A* is the transpose and conjugate of the extended channel matrix A. As shown, the inverse matrix calculation is performed at the BBU, leaving the RRU with the less processor intensive calculations.

According to an embodiment, the method further comprises receiving 303, from the RRU 120, information on the channel estimation matrix Ĥ and the error estimation matrix Z.

According to an alternative of this embodiment, the received 303 information on the channel estimation matrix Ĥ and the error estimation matrix Z is coefficients of an extended channel matrix A, which is obtained based on the channel estimation matrix Ĥ and the error estimation matrix Z.

According to another alternative, the received 303 information on the channel estimation matrix Ĥ and the error estimation matrix Z is coefficients of an intermediate matrix I determined as A*A, where A is an extended channel matrix that is obtained based on the channel estimation matrix Ĥ and the error estimation matrix Z, and A* is the transpose and conjugate of the extended channel matrix A.

According to another embodiment, the interference rejection matrix $W_K$ is determined 306 based on sent reference signals $x_{ref,l}$ sent by the UEs and received at the RRU, which reference signals were used for determining the channel estimation matrix Ĥ and the error estimation matrix Z at the RRU, the sent reference signals $x_{ref,l}$ being known by the BBU 110, and on intermediate reference signals $ỹ_{ref,l}=A^*y_{ref,l}$, that correspond to the sent reference signals $x_{ref,l}$ as received over the fronthaul link from the RRU. The intermediate reference signals $ỹ_{ref,l}$ may be extracted from the received intermediate signals ỹ. Hereby it is possible to determine the interference rejection matrix $W_K$ without sending any specific information on the channel estimation matrix Ĥ and the error estimation matrix Z from the RRU. Hereby, capacity of the fronthaul link is saved.

According to an alternative of this embodiment, the interference rejection matrix $W_K$ is determined 306 by:
determining, based on the sent reference signals $x_{ref,l}$, $$\text{an intermediate matrix } I = A^*A = \begin{bmatrix} \hat{H}^*\hat{H} & \hat{H}^*Z \\ Z^*\hat{H} & Z^*Z \end{bmatrix}$$

where A is an extended channel matrix in which the channel estimation matrix Ĥ and the error estimation matrix Z are combined, A* is the transpose and conjugate of the extended channel matrix A, Ĥ* is the transpose and conjugate of the channel estimation matrix Ĥ and Z* is the transpose and conjugate of the error estimation matrix Z, and
determining the first K rows of the inverse of the intermediate matrix I as the interference rejection matrix $W_K$.

According to another embodiment, wherein the error estimation matrix Z is decomposed into a first part matrix $G_R$ and a second part matrix $V_R$, the method further comprises receiving 304, from the RRU, information of the second part matrix $V_R$, wherein Z is approximated at the RRU as the multiplication of the first part matrix $G_R$ and the transpose and conjugate of the second part matrix $V_R$, in which $G_R$ has M columns and $V_R$ has M columns. The M column vectors of $V_R$ are the right-singular vectors corresponding to the M largest singular values of the error estimation matrix Z, M being smaller than L, L being the number of symbols of a sent reference signal $x_{ref,l}$ used for determining the channel estimation matrix $\hat{H}$ and the error estimation matrix Z at the RRU, L being smaller than N, the first part matrix $G_R$ being used at the RRU for determining the intermediate signals $\tilde{y}$. Further, the determining 306 of the interference rejection matrix W is based on the sent reference signals $x_{ref,l}$ and on the second part matrix $V_R$.

According to an alternative of the above embodiment, the interference rejection matrix $W_K$ is determined 306 as the first K rows of $(A^*A)^{-1}$, where A is an extended channel matrix in which the channel estimation matrix $\hat{H}$ and the first part matrix $G_R$ are combined, and $A^*$ is the transpose and conjugate of the extended channel matrix A.

According to another alternative, the method further comprises receiving 303, from the RRU 120, information on the channel estimation matrix $\hat{H}$ and the first part matrix $G_R$.

The received 303 information on the channel estimation matrix and the first part matrix $G_R$ may be coefficients of an extended channel matrix A in which the channel estimation matrix $\hat{H}$ and the first part matrix $G_R$ are combined. Alternatively, the received 303 information on the channel estimation matrix $\hat{H}$ and the first part matrix $G_R$ may be coefficients of an intermediate matrix I determined as $A^*A$, where A is an extended channel matrix in which the channel estimation matrix $\hat{H}$ and the first part matrix $G_R$ are combined, and $A^*$ is the transpose and conjugate of the extended channel matrix A.

According to another alternative, the interference rejection matrix $W_K$ is determined 306 based on sent reference signals $x_{ref,l}$ sent by the UEs and received at the RRU, which sent reference signals were used for determining the channel estimation matrix $\hat{H}$ and the error estimation matrix Z at the RRU 120, the sent reference signals $x_{ref,l}$ being known by the BBU 110, and on intermediate reference signals $\tilde{y}_{ref,l}=A^*y_{ref,l}$, which corresponds to the sent reference signals $x_{ref,l}$ as received over the fronthaul link from the RRU and on the second part matrix $V_R$ of the decomposition of the error estimation matrix Z.

According to another embodiment, the interference rejection matrix $W_K$ may be determined 306 by:
determining, based on the sent reference signals $x_{ref}$ and the second part matrix $V_R$ of the decomposition of the error estimation matrix Z, $$\text{an intermediate matrix } I = A^*A = \begin{bmatrix} \hat{H}^*\hat{H} & \hat{H}^*G_R \\ G_R^*\hat{H} & G_R^*G_R \end{bmatrix}$$

where A is an extended channel matrix in which the channel estimation matrix $\hat{H}$ and the first part matrix $G_R$ are combined, $A^*$ is the transpose and conjugate of the extended channel matrix A, $\hat{H}^*$ is the transpose and conjugate of the channel estimation matrix $\hat{H}$ and $G_R^*$ is the transpose and conjugate of the first part matrix $G_R$, and
determining the first K rows of the inverse of the intermediate matrix I as the interference rejection matrix $W_K$.

In the following embodiment, a scenario is described with K user layers in a desired cell and J interferers from the interfering cells. In antenna element domain or beam/direction domain, the desired channel of the number of UEs in the desired cell, called target users, is denoted as $H \in \mathbb{C}^{N \times K}$ where N is the number of antenna elements at the RRU, whereas the interference channel from the interfering UEs in neighboring cells, called interferers, is denoted as $H_I \in \mathbb{C}^{N \times J}$. The transmit signals from the target users and the interferers are denoted as $x \in \mathbb{C}^{K \times 1}$ and $x_I \in \mathbb{C}^{J \times 1}$, respectively. The received signal in direction domain can be expressed as $$y = Hx + H_I x_I + n = Hx + z$$

where $n \in \mathbb{C}^{N \times 1}$ denotes the additive noise, and $z = H_I x_I + n \in \mathbb{C}^{N \times 1}$ denotes an interference-plus-noise vector. In theory, the IRC matrix can be written as $$W_{IRC} = H^*(HH^* + R)^{-1} \qquad (1)$$

where R is the estimated covariance matrix of interference-and-noise. One way to estimate R is to use the interference-and-noise signals. Once the desired channel H is estimated with L known symbols, based on a reference signal as sent from the UEs, the reference signal being called $x_i$ for $i=1, \ldots, L$, e.g. a Demodulation Reference Signal (DMRS) having L symbols, an N×L matrix can be composed as $$Z = 1/\sqrt{L}[\hat{z}_1 \ldots \hat{z}_L] \qquad (2)$$

where $\hat{z}_i = y_{ref,i} - \hat{H}x_{ref,i}$ for $i=1, \ldots, L$ and $\hat{H}$ is the channel estimate. The matrix Z is hereinafter referred to as an error estimation matrix, which is an estimation of errors due to co-channel interference and noise. The estimation of the covariance matrix of interference and noise becomes $\hat{R} = ZZ^*$.

Figure 4:
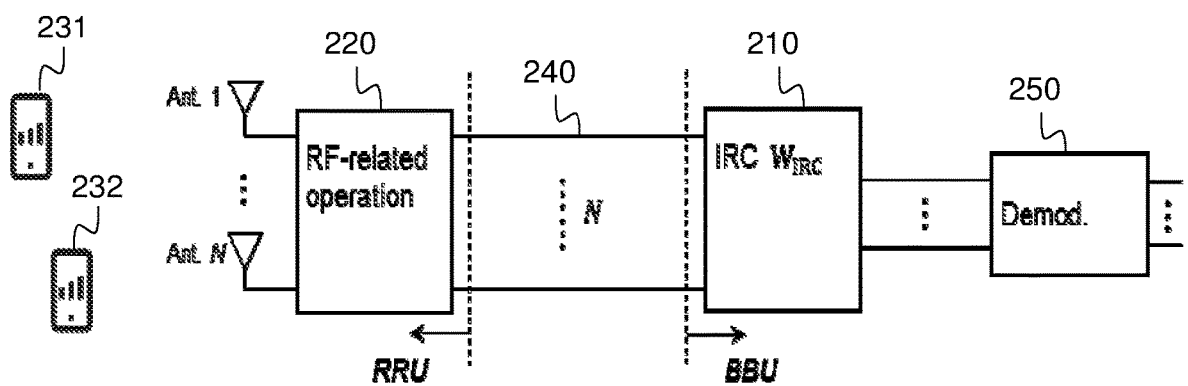
FIG. 4 is a schematic block diagram of a split of functionalities between the RRU and the BBU according to prior art.

FIG. 4 describes a CPRI-based FH functionality architecture. The functionality comprises RF-related operation functionality 420, IRC computation functionality 410 and demodulation functionality 450. 440 symbolizes the fronthaul link between the RRU and the BBU. The RRU has N antennas for receiving signals K user-layer signals from UEs 431, 432. In this architecture, the IRC computation functionality 410 is implemented at the BBU whereas the RRU only has the RF-related operation functionality 420. The demodulation functionality 450, at which the K user-layer signals as reconstructed by the RRU and the BBU is demodulated, is implemented at the BBU. This FH functionality architecture requires N FH streams to carry the time-domain samples from the N antennas from the RRU to the BBU, which requires a huge amount of FH capacity when the number of antennas N is large.

Figure 5:
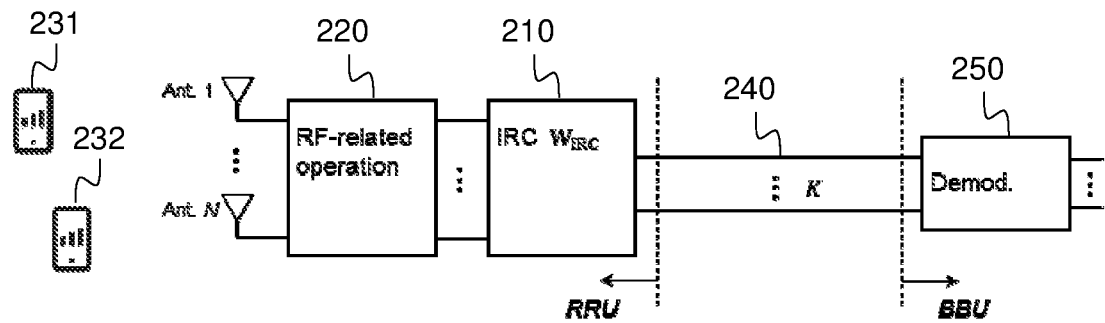
FIG. 5 is a schematic block diagram of another type of split of functionalities between the RRU and the BBU according to another prior art.

FIG. 5 describes a solution in a similar architecture as in FIG. 4, with like numerals referring to like functionality, but where the IRC processing functionality 410 has been moved from the BBU to the RRU. Here the required FH streams can be reduced to K, which is the number of user layers. However, the term in the parenthesis of Equation (1) is an N×N matrix. The inversion of the N×N matrix drives up the complexity exponentially to the size of the matrix. The increased complexity will drive up cost, power consumption and weight of the RRU.

Figure 6:
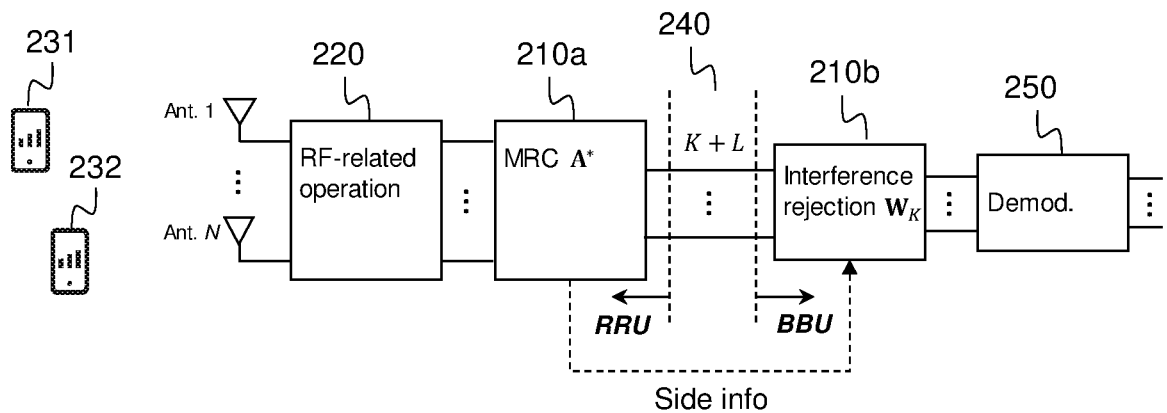
FIG. 6 is a schematic block diagram of another type of split of functionalities between the RRU and the BBU, according to embodiments of the invention.

To be able to have a less complex RRU and still to keep the necessary fronthaul capacity limited, embodiments of this invention proposes a functional split between the RRU and the BBU to implement the IRC algorithm in two phases. Such a functional split is described in FIG. 6 in a similar architecture as in FIG. 4, with like numerals referring to like functionality. A first 410a of the two phases of the IRC computation functionality is performed in the RRU. The first IRC computation functionality phase 410a performs simple processing, e.g. MRC, to largely reduce the required FH streams while maintaining sufficient signal information and degrees of freedom for further processing in the BBU. The second 410b of the two phases carries out interference rejection on the processed signal from the RRU. The second functionality phase 410b is placed in the BBU. FIG. 6 also illustrates that optionally side information, such as information of A*, AA* or $V_R$ can be sent over the fronthaul link 440 to the BBU, information that is required in some embodiments. More details about the side information will be described later.

Direct decomposition of the formula of $W_{IRC}$ in Equation (1) in two parts as H* and $(HH^*+R)^{-1}$ does not work, since now the computational intensive part $(HH^*+R)^{-1}$ sits on the right-hand side, which would be implemented in the RRU. Moreover, $(HH^*+R)^{-1}$ results in an N×N matrix which does not reduce the generated data streams sent over the fronthaul. Instead, a method is described to first mathematically transform the IRC processing in Equation (1) into a formulation of ZF processing. Then it can be decomposed into two parts, the first part performed in the RRU and the second part in the BBU, which reduces the RRU complexity, as well as reduces the number of the FH streams comparing to the CPRI case.

The first part of operations performed in the RRU. After obtaining a channel estimation of the desired channel H, denoted by A, the error estimation matrix Z is determined, using Equation (2). Then, an extended channel matrix A is constructed, composed by the estimated desired channel and the error matrix as $$A = [\hat{H}\ Z] \quad (3)$$

The signal y received from the N antennas is then multiplied with the transpose and conjugate A* of the extended channel matrix A in the RRU. This multiplication can be interpreted as applying an MRC operation for the extended channel A. After the MRC operation, an intermediate signal $\tilde{y}$ becomes $\tilde{y}=A^*y$, which has been reduced from N to K+L streams compared to the originally received signal y which is comprised of N FH streams. L is the number of symbols in the reference signal from which the extended channel is estimated. Then the RRU sends the intermediate signal $\tilde{y}$ to the BBU.

The second part of operations, performed in the BBU. In the BBU, the interference rejection/mitigation is conducted. To achieve that, the received signal $\tilde{y}$ received from the RRU over the fronthaul link is multiplied by an interference rejection matrix, where $W_K$ equals the first K rows of $(A^*A)^{-1}$. After interference mitigation by $W_K$, the signal becomes $r=W_K\tilde{y}=W_KA^*y$. Further down, it will be shown that $W_KA^*=W_{IRC}$. The signal r is comprised of K streams, each of which corresponds to one layer with interference mitigated by IRC. The signal r is then brought to the demodulation functionality 250.

Note that A*A is a (K+L)×(K+L) matrix. There are three ways for the BBU to acquire the first K rows of $(A^*A)^{-1}$.
1) The coefficients of the extend channel matrix A is sent directly from the RRU to the BBU. In this case, the RRU does not do any further processing except for the defined first part above, but sends the N*(K+L) coefficients in addition to the intermediate data signal $\tilde{y}$ to the BBU. The BBU calculates $W_K$ by using a block matrix inversion property described later on in connection with Equation (7).
2) RRU calculates A*A and sends the (K+L)×(K+L) coefficients in addition to the data signals to the BBU. In this case, the RRU carries out one more matrix multiplication, but the coefficients to be sent are reduced. In the case of 5G NR at higher frequencies, we normally consider N>>(K+L). Then, BBU calculates $W_K$ by using the block matrix inversion property described later on in connection with Equation (7).
3) RRU only sends the intermediate signal $\tilde{y}$ to the BBU, and the BBU derives $W_K$ based on L received intermediate reference signals $\tilde{y}_{ref,l}$ (l=1 to L), which may be extracted from the received intermediate signal $\tilde{y}$ and the known sent reference signals $x_{ref,l}$. According to an embodiment, the details are as follows:
First the ith received reference symbol of the received intermediate reference signals at BBU is calculated as $$\tilde{y}_{ref,l} = A^* y_{ref,l} = [\hat{H}^* Z^*](Hx_{ref,l} + \hat{z}_l)$$

Then write the L received reference symbols as a matrix $$\tilde{Y}_{ref} = [\tilde{y}_{ref,1}\ \tilde{y}_{ref,2}\ \cdots\ \tilde{y}_{ref,L}] = \begin{bmatrix}\hat{H}^*\\Z^*\end{bmatrix}(HX_{ref}+Z) = \begin{bmatrix}\hat{H}^*H\\Z^*H\end{bmatrix}X_{ref} + \begin{bmatrix}\hat{H}^*Z\\Z^*Z\end{bmatrix}$$

With the knowledge of the known sent reference signals $X_{ref}$, the BBU can estimate $$\begin{bmatrix}\hat{H}^*H\\Z^*H\end{bmatrix}$$

and then obtain $$\begin{bmatrix}\hat{H}^*Z\\Z^*Z\end{bmatrix} = \tilde{Y}_{ref} - \begin{bmatrix}\hat{H}^*H\\Z^*H\end{bmatrix}X_{ref}$$

It is observed that these two block matrices are sufficient to calculate $$A^*A = \begin{bmatrix}\hat{H}^*H & \hat{H}^*Z\\Z^*\hat{H} & Z^*Z\end{bmatrix}$$

assuming the estimation $\hat{H} \approx H$. Then, the BBU calculates $W_K$ accordingly by making use of the block matrix inversion property.

In the following, an embodiment is described in which the information sent over the fronthaul is further reduced by performing some extra computation in the RRU using SVD. As described before, the proposed method will send K+M FH streams from the RRU to the BBU, where M represents the additional degrees of freedom kept for mitigating the inter-cell interferences. So, M should be larger than or equal to the number of interferers, J, in order to achieve an effective interference mitigation.

From the perspective of minimizing the FH bit rate, it is desirable to reduce M as much as possible. However, simply reducing number of symbols involved in the error estimation matrix Z would reduce the estimation quality of the covariance matrix and thereby degrade the performance. The following processing in the RRU would be beneficial when the FH load reduction is demanding while the RRU can afford some extra computational complexity.

Statistically, the interference-and-noise covariance matrix gives $$R = E[ZZ^*] \approx H_I H_I^* + \sigma^2 I_N$$

where $\sigma^2$ is the background-noise power. Note that $H_I H_I^*$ is the covariance matrix of an N×J matrix, whose rank is at most J. When the interference channel is noticeably stronger than the background noise, which is the case to implement IRC, R should be effectively approximated by J principal components, i.e. approximation is done by an N×N covariance matrix with rank J, to represent the number of significant interferers.

In the following, a principal-component-based method is presented aiming at reducing the dimension of the extended channel matrix A to N×(K+M), where 1<=M<=L, while still utilizing all reference signals to keep the estimation quality of the covariance matrix. For example, in LTE, there are 12 reference signals in one resource block (RB). If there are only 4 significant interferers, it would be desirable to only transport 4 extra streams for interference mitigation. Although the matrix-decomposition-based methods presented below would increase some complexity in the RRU, this will reduce the number of FH streams. It is also able to detect the number of interferers and thereby the number of FH streams needed. Additionally, both methods determine the number of noticeable interferences based on the number of large singular values and make the scheme adaptive to the number of interferers.

SVD is an effective dimension reduction method as it keeps only the strongest singular values and their corresponding singular vectors. Regarding the interference covariance calculated directly from data/reference symbols, the singular value decomposition (SVD) of data samples of the error estimation matrix Z is expressed as $$Z = U\Sigma V^* \quad (4)$$

where the singular values in $\Sigma$ are presented in a descending order. Thereafter, a first part matrix is defined as $G_R = U_R \Sigma_R$, where $\Sigma_R$ is a M×M diagonal matrix composed by the M largest singular values of Z, and $U_R$ is composed by the first J columns of U. Accordingly, the extended channel is composed as $$A = [H \; G_R]$$

which is an N× (K+M) matrix. As discussed above, it is sufficient to take M=J since J interferences is assumed here.

Based on this approximation, an MRC in the RRU can be conducted regarding A generating only K+J FH streams (assume M=J here and in the following), while the interference rejection matrix $W_K$ composed by the first K rows of $(A^*A)^{-1}$ is implemented in the BBU.

The SVD performed above is for finding the best J-rank approximation of the original error estimation matrix Z, which can be done efficiently with fast approximation algorithms, as described in "Fast SVD for large-scale matrices", by M. P. Holmes et al, 2007. So, such an SVD operation can still be much simpler than the matrix inversion required by a full IRC, as J<<N. The required computation complexity of matrix inversion is described in "Floating point operations in matrix-vector calculus, Technical report, by R. Hunger, 2007.

Similarly, there are three ways for the BBU to acquire the first K rows of $(A^*A)^{-1}$:

- The N×(K+J) extended channel coefficients in the extended channel matrix A is sent directly from the RRU to the BBU.
- The calculated A*A with (K+J)×(K+J) coefficients are sent from the RRU to the BBU.
- The BBU derives $W_K$ based on the L symbols of the received intermediate reference signal $\tilde{y}_{ref,l}$, the known reference symbols of the sent reference signal $x_{ref,l}$ and L×J coefficients of $V_R$, which is composed by the first J columns of V in formula (4). A*A can then be estimated from the received intermediate reference signals $\tilde{Y}_{ref} = [\tilde{y}_{ref,1} \; \tilde{y}_{ref,2} \; \ldots \; \tilde{y}_{ref,L}]$ expressed in the matrix form and the prior knowledge of the sent reference signal $X_{ref} = [x_{ref,1} \; x_{ref,2} \; \ldots \; x_{ref,L}]$ expressed in the matrix form, with the help of $V_R$. The derivation will be presented further down.

Figure 7:
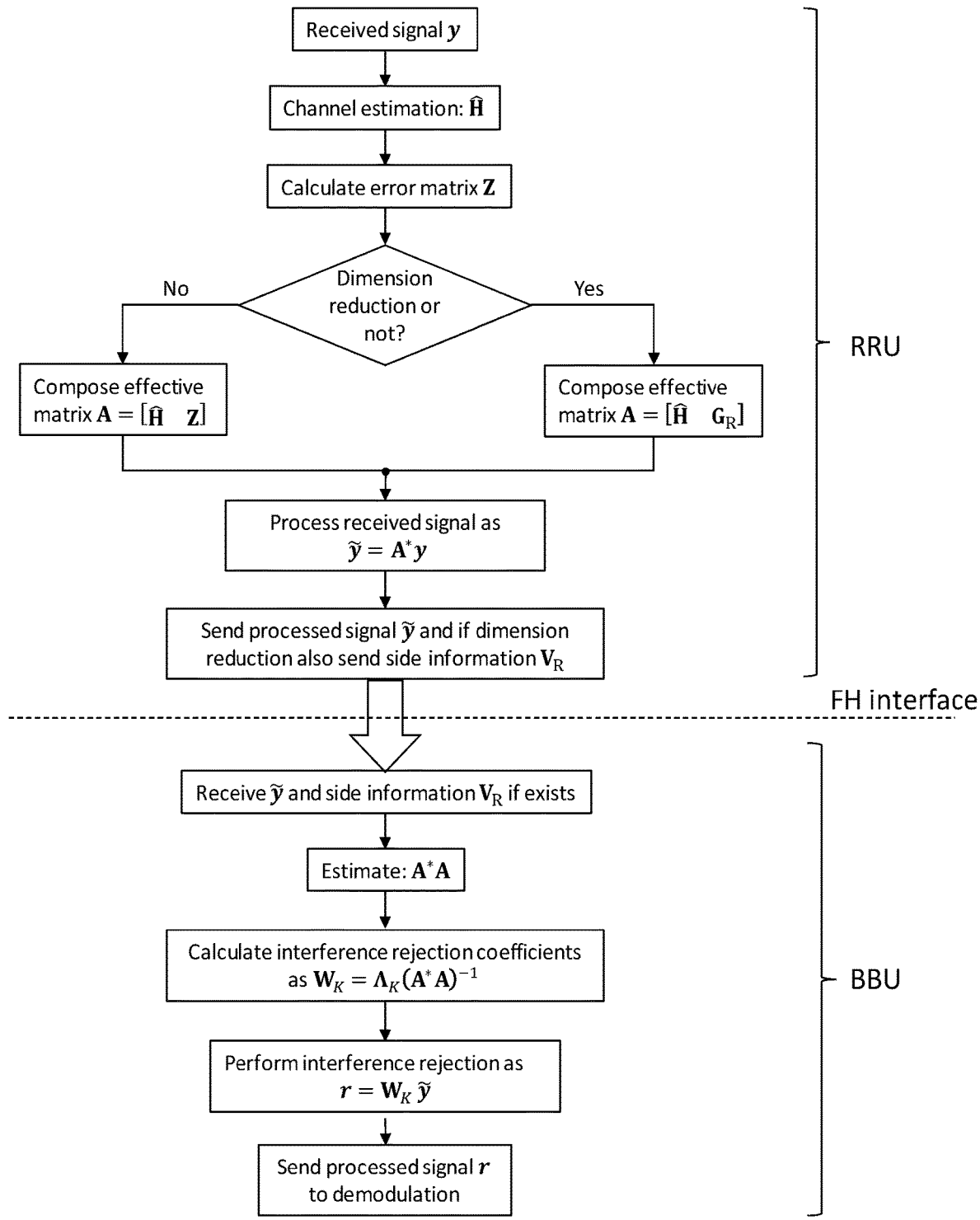
FIG. 7 is a flow chart illustrating a method for handling uplink signals in a distributed base station system with a functional split such as in FIG. 6, according to possible embodiments.
Figure 8:
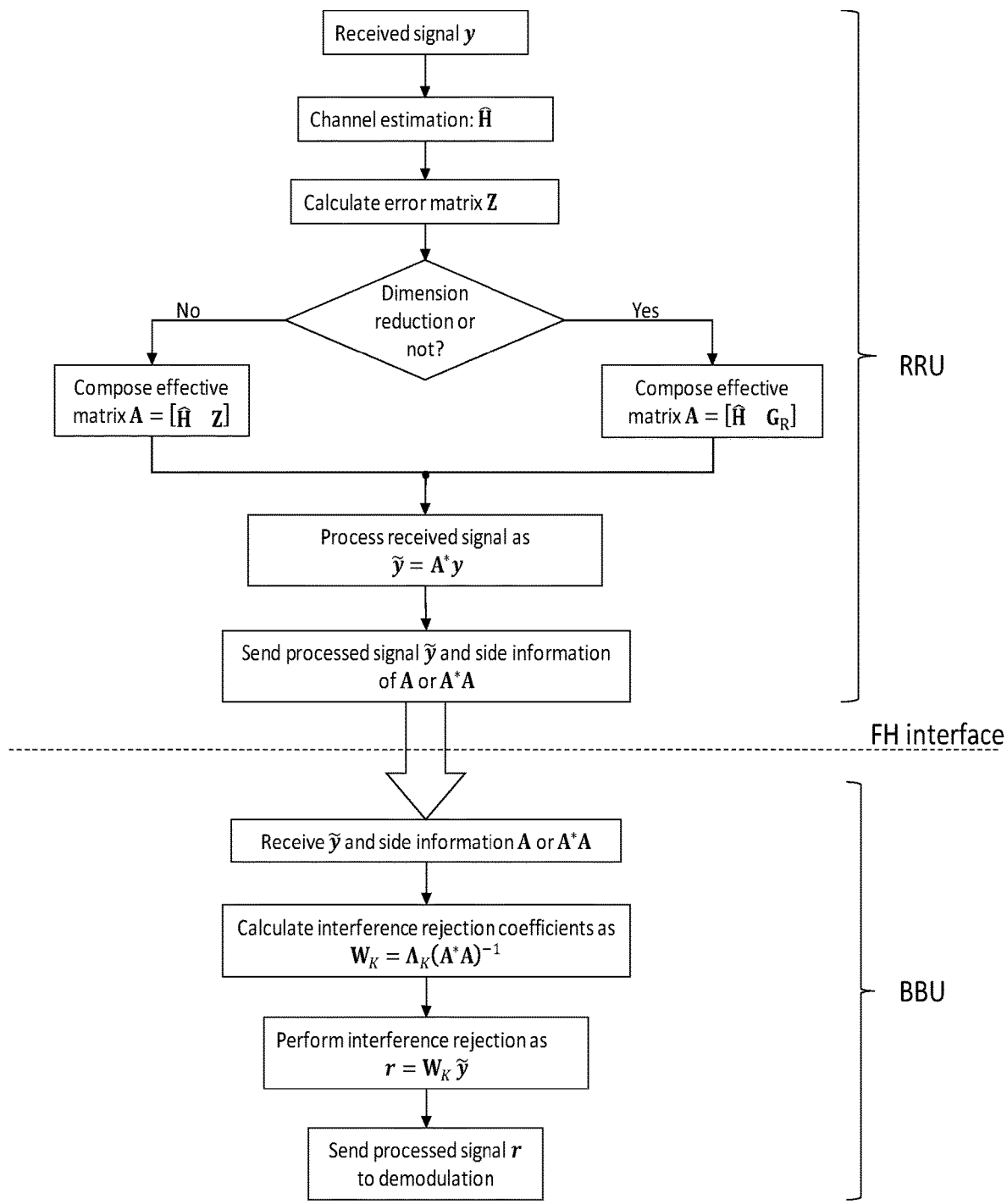
FIG. 8 is a flow chart illustrating a method for handling uplink signals in a distributed base station system with a functional split such as in FIG. 6, according to other possible embodiments.

Two flow charts illustrating embodiments of the above described methods are presented in FIG. 7 and FIG. 8. FIG. 7 shows the embodiments in which the BBU estimates A*A while FIG. 8 shows the embodiments where the BBU obtains A*A from the side information sent from the RRU. In particular, Ax denotes the first K rows of an identity matrix whose dimension depends on the number of columns in A.

The embodiment of FIG. 7 starts by the RRU receiving 502 the data signal y at the RRU, from N antennas connected to the RRU, the data signal y actually comprising N data signals, one from each antenna. The wireless communication channel H between the UEs and the RRU is then estimated $\hat{H}$ 504 based on a reference signal known by the RRU that is sent from the UEs. Further, the channel error is estimated 506 as a channel estimation matrix Z based on the channel $\hat{H}$ estimate and on the sent reference signal $x_{ref,l}$ (l=1 to L). Further, if no dimension reduction, e.g. based on SVD, of the error estimation matrix is performed, the RRU composes 508 an effective matrix, aka extended channel matrix A as A=[$\hat{H}$ Z]. If dimension reduction is performed, the RRU composes 510 the extended channel matrix as A=[$\hat{H}$ $G_R$]. Then the RRU determines 512 an intermediate signal $\tilde{y}$ of the received data signal y as $\tilde{y} = A^* y$, and sends 514 the determined (aka processed) intermediate signal $\tilde{y}$ over the fronthaul interface to the BBU. If dimension reduction was performed of the error estimation matrix, side information on the second part matrix $V_R$ defining the dimension reduction is also sent to the BBU.

At the BBU side, the intermediate signal $\tilde{y}$ is received 516 from the RRU over the fronthaul interface, aka link, and if dimension reduction was performed, also the side information on the second part matrix $V_R$ is received. The BBU then estimates 518 A*A based on the sent reference signal $x_{ref,l}$ as described earlier, and calculates 520 interference rejection coefficients $W_K$ as the first K rows of $(A^*A)^{-1}$. The BBU then performs 522 interference rejection on the intermediate signal $\tilde{y}$ as $W_K \tilde{y}$ in order to receive a processed signal r of an original signal x sent from the UEs in which interference from UEs connected to other base stations or base station systems is mitigated. The processed signal r is then demodulated 524, preferably also at the BBU.

In the embodiment of FIG. 8, most steps are the same as in the embodiment of FIG. 7, and like numerals as in FIG. 7 refer to like functions. However, the step 514 is modified as step 514a. Apart from sending the intermediate signal $\tilde{y}$ to the BBU, information of the extended matrix A or the intermediate matrix I=A*A is sent to the BBU as side information. Further, in the embodiment of FIG. 8 there is no step of estimating A*A based on the sent reference signal $x_{ref,l}$, as coefficients of A or A*A are sent over the fronthaul interface. However, in case coefficients of A are sent, A*A is calculated in the BBU.

Simulations have been performed to show the effect with the described embodiments. The simulations assume perfect channel state information (CSI) available in the direction domain. For L=12, the Quadrature Phase Shift Keying (QPSK)-based sequence specified in 3GPP TS 36.211 for uplink reference signals was used as the base sequence for generating the simulations assume perfect channel state information (CSI) available in the direction domain. For L=12, the QPSK-based sequence specified in TS36.211 for uplink reference signals was used as the base sequence for generating the interference signals $x_l$.

Other simulation setup is listed below:
Base station: 64-element uniform linear array with half wavelength spacing and each element is omni-directional.
UEs: 8 UEs with one antenna each. Therefore, 8 user-layers in total where each UE has one layer.
Multipath channel: The channel is modeled from the RRU perspective with 5 multipath clusters, each of which has 1 "Line-of-Sight" (LOS) component representing the strong component in the cluster and 5 other multipath components in each cluster.
The amplitude of each component is Rayleigh distributed and the phase is uniformed distributed in [−pi, pi]. The multipath component has 5-10 dB lower power than the "LOS". The power offset is uniformly distributed in [5 10] dB.
The angle of departure (AoD) of the LOS component is uniformly distribute in [−60, 60] degrees, assuming covering a 120-degree Cell sector. The multipath components with angular spread of 5 degrees in each cluster with a uniform distribution in [−2.5, 2.5] degrees around the LOS AOD.
Received SNR per transmit antenna element: 0 dB.
The channel Signal to Interference Ratio (SIR): 0 dB.
The simulation is done with a direction domain implementation with a 64-point Digital Fourier Transform (DFT), i.e. Fast Fourier Transform (FFT) generating 64 fixed directions.

Figure 9:
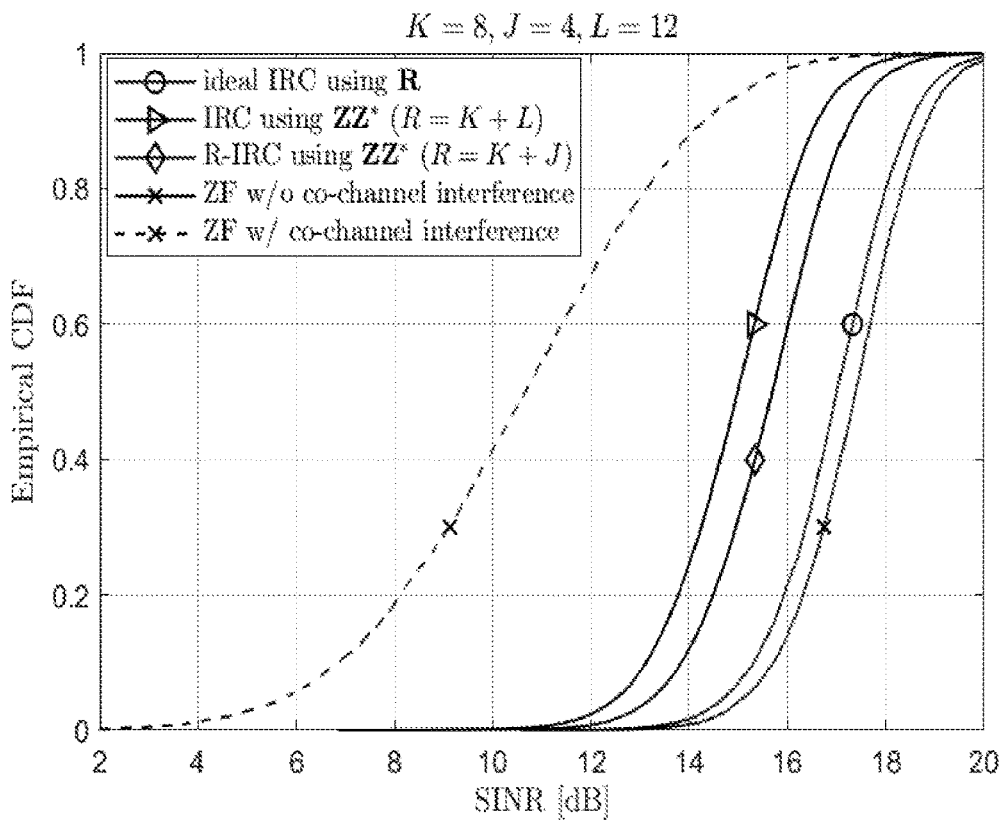
FIG. 9 is a Cartesian coordinate diagram showing SINR distribution for simulations of prior art with and without interference compared to different embodiments of the invention with interference mitigated.

FIG. 9 compares the Signal to Interference and Noise Ratio (SINR) performances of the proposed methods to the ideal IRC, which performs as shown in formula (1). Also, the zero-forcing (ZF) method in scenarios with and without the co-channel interferences are also shown as references. The "IRC using ZZ*" curve corresponds to the basic procedure without using SVD, whereas the "R-IRC using ZZ*" curve corresponds to the embodiment where additional dimension reduction using SVD is done in RRU. In FIG. 9, M=J=4.

In particular, the ZF without co-channel interference presents as the best performance since the intra-cell interference is mitigated with no co-channel interference existing; the ZF with co-channel interference presents as a lower-bound since the ZF equalizer does not take the co-channel interference into account.

The ideal IRC of formula (1), when both the interference channel and the noise variance are known, performs quite close to the ZF-without-co-channel-interference case, which means that both inter-and-intra-cell interference are effectively mitigated.

When $\hat{R}=ZZ^*$ is assumed and the number of interferers is known, the method with additional dimension reduction in the RRU can achieve even slightly better performance than the basic procedure, both of which are based on the interference-and-noise realizations of L REs while the R-IRC has the advantage of generating less FH streams for data transport.

The gap between the proposed methods and the ideal IRC is partly due to noise floor $E[x_l^*n] \neq 0$. Therefore, $\hat{R}=ZZ^*$ would be a biased estimation for $R=H_l H_l^* + \sigma^2 I_N$.

Figure 10:
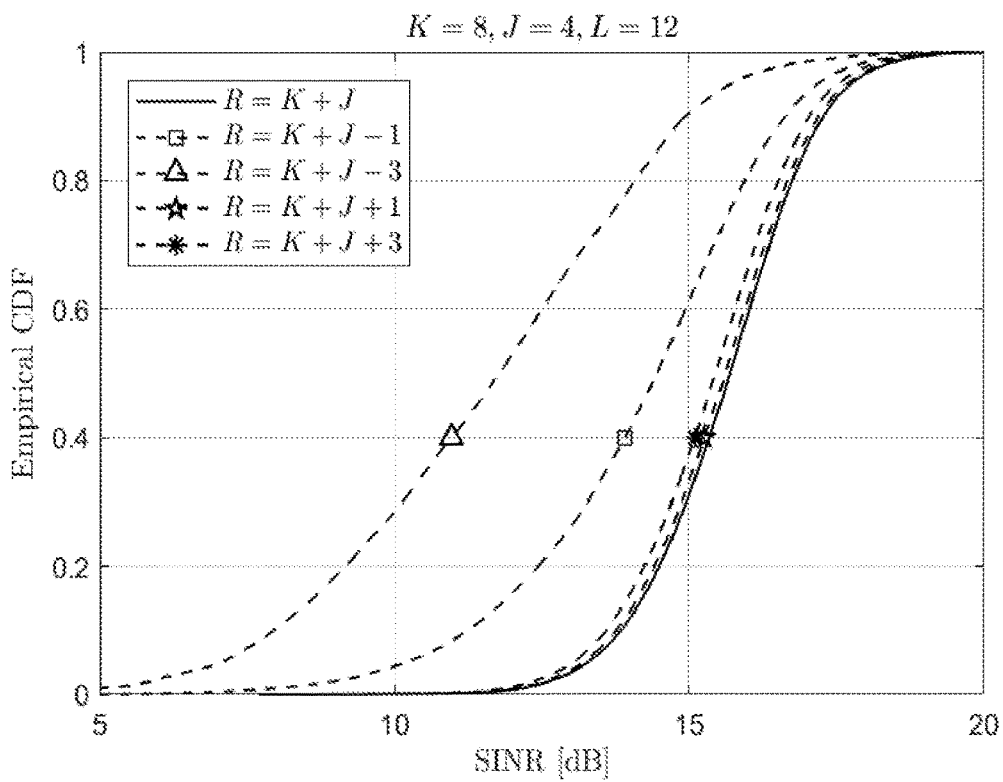
FIG. 10 is a Cartesian coordinate diagram showing SINR distribution for simulations of different embodiments of the invention.

FIG. 10 investigates how the number of selected principal components in $G_R$ impact on performances. A cumulative distribution function (CDF) of simulated SINR-values is shown for different number of principal components for the R-IRC method based on ZZ* when J=4 From FIG. 10 it can be seen that the best is to select the same number of principal components as the number of interferers, i.e. M=J=4. Using a number more than J, i.e. M>J, will slightly degrade the performance due to the extra noise components included. Also, it increases the number of FH streams for data transport. The performance will be largely degraded if the selected number is smaller than J, i.e. M<J, because some of the principal components which include necessary interference information are ignored.

In the following, a mathematical explanation of embodiments of the invention is provided. Firstly, transformation of IRC formulas is explained. Regarding the extended channel A as in Equation (3), define a (K+L)×N auxiliary ZF equalizer as $$W_{zf}=(A^*A)^{-1}A^*=(A^*A)^{-1}[H^* \ Z^*] \quad (5)$$

Let $\Lambda_K$ denote the first K rows of an (K+L)×(K+L) identity matrix. Let $W_{zf,K}$ denote the first K rows of $W_{zf}$, i.e., $\Lambda_{zf,K}=\Lambda_K W_{zf}$. It can be shown mathematically that $$W_{zf,K}=H^*(AA^*)^{-1}=H^*(HH^*+ZZ^*)^{-1}=W_{IRC} \quad (6)$$

Also, $W_{zf,K}$ regarding Equation (5) can be written as $$W_{zf,K}=\Lambda_K W_{zf}=\Lambda_K(A^*A)^{-1}A^*=W_K A^*$$

where $W_K=\Lambda_K(A^*A)^{-1}$ is composed by the first K rows of $(A^*A)^{-1}$. Therefore, $W_{IRC}=W_K A^*$, which indicates that we can implement IRC by applying $A^*$ in the RRU and $W_K$ in the BBU.

In case of the dimension reduction of the error estimation matrix Z, the interference-and-noise covariance matrix is approximated by $$ZZ^*=U\Sigma\Sigma U^* \approx U_R \Sigma_R \Sigma_R U_R^* = G_R G_R^*$$

Accordingly, the IRC equalizer can be approximated by where $$W_{IRC} \approx H^*\left(HH^* + U_R \sum_R \sum_R U_R^*\right)^{-1} = H^*(A^*A)^{-1} = W_K A^*$$

where $W_K = \Lambda_K(A^*A)^{-1}$.

In the following it is described mathematically how complexity can be reduced in the BBU via block matrix inversion for $W_K$. As shown previously, $W_K$ equals the first K rows of $(A^*A)^{-1}$. Here we show that the direct calculation of $(A^*A)^{-1}$ is not needed to obtain $W_K$. Note that $A^*A$ is composed by four block matrices as $$A^*A = \begin{bmatrix} B & D \\ C & E \end{bmatrix}$$

where B is a K×K block matrix, C is a L×K block matrix, D is a K×L block matrix and E is a L×L block matrix. According to the block matrix inversion property, the first K rows of $(A^*A)^{-1}$ can be derived as $$W_K=[(B-DE^{-1}C)^{-1} \ -(B-DE^{-1}C)^{-1}DE^{-1}] \quad (7)$$

In this way, the complexity is reduced for calculating $W_K$, as it is only needed to calculate one L×L matrix inversion and one K×K matrix inversion. The complexity is lower than calculating the inversion of a (K+L)×(K+L) matrix. In case of the dimension reduction as discussed earlier, the first K rows of $(A^*A)^{-1}$ is calculated by $$W_K=[(\tilde{B}-\tilde{D}\tilde{E}^{-1}\tilde{C})^{-1} \ -(\tilde{B}-\tilde{D}\tilde{E}^{-1}\tilde{C})^{-1}\tilde{D}\tilde{E}^{-1}]$$

where $\tilde{C} \in \mathbb{C}^{J \times K} = G_R^* H$, $\tilde{D} \in \mathbb{C}^{K \times J} = H^* G_R$ and $\tilde{E} \in \mathbb{C}^{J \times J} = G_R^* G_R$. Here, the computational complexity in BBU is also reduced comparing to equation(7), since the dimension of $\tilde{C}$, $\tilde{D}$, and $\tilde{E}$ is reduced.

In the following it is described mathematically an estimation in the BBU of $W_K$ for the SVD-based dimension reduction case. The details are as follows: Write the L received reference signals as a matrix $$Y_{ref} = \begin{bmatrix} \hat{H}^* \\ G_R^* \end{bmatrix}(HX_{ref} + Z) = \begin{bmatrix} \hat{H}^*\hat{H} \\ G_R^*\hat{H} \end{bmatrix}X_{ref} + \begin{bmatrix} \hat{H}^*Z \\ G_R^*Z \end{bmatrix}$$

Note that $$A^*A = \begin{bmatrix} \hat{H}^*\hat{H} & \hat{H}^*G_R \\ G_R^*\hat{H} & G_R^*G_R \end{bmatrix}$$

whereas the rightmost matrix of the above equation contains Z instead of $G_R$, which is the one we need to estimate $A^*A$. Therefore, $V_R$ is needed from RRU since $G_R = ZV_R$. Then the four block matrices of $A^*A$ can be estimated from the received $\tilde{Y}_{ref}$ and the prior knowledge of $X_{ref}$ with the help of $V_R$.

Figure 11:
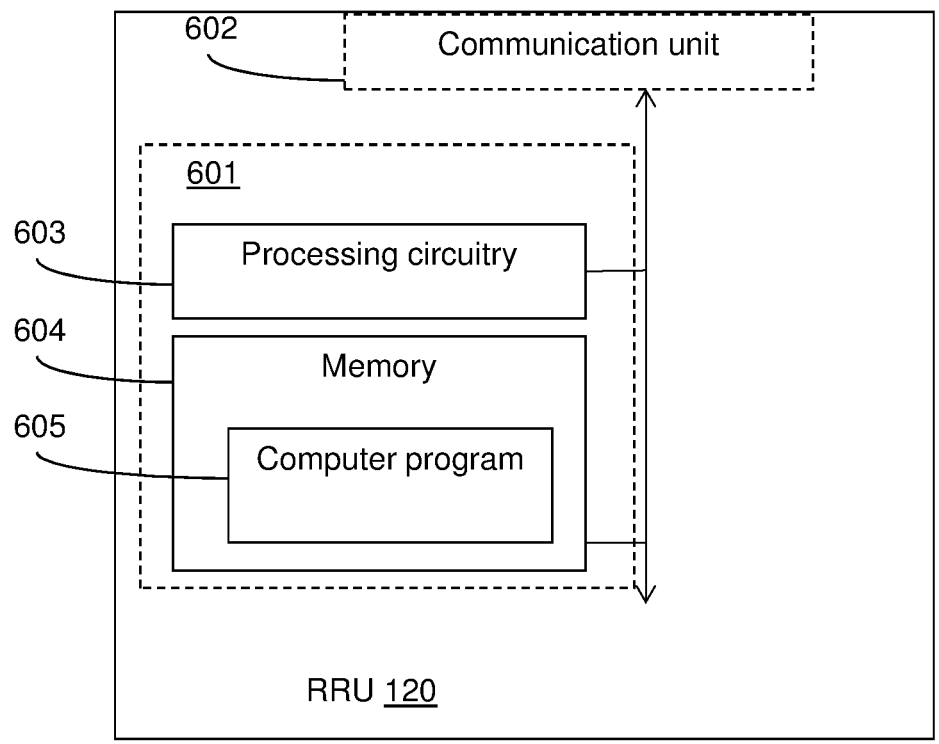
FIG. 11 is a block diagram illustrating an RRU in more detail, according to further possible embodiments.

FIG. 11, in conjunction with FIG. 1, describes an RRU 120 operable in a distributed base station system 100 of a wireless communication network, the distributed base station system 100 further comprising a BBU 110 connected to the RRU over a fronthaul link. The RRU 120 is connected to N antennas 121, 122, 123. The RRU 120 comprises a processing circuitry 603 and a memory 604. Said memory contains instructions executable by said processing circuitry, whereby the RRU 120 is operative for obtaining uplink signals y as received at the N antennas 121, 122, 123 from a number of UEs 131, 132, 133 wirelessly connected to the RRU 120, the uplink signals comprising K user-layer signals overlaid with interference signals and noise, and for obtaining a channel estimation matrix $\hat{H}$ of wireless communication channels H between the number UEs 131, 132, 133 and the N antennas 121, 122, 123. The RRU 120 is further operative for determining an error estimation matrix Z based on the obtained channel estimation matrix $\hat{H}$, and on received reference signals $y_{ref,l}$ as received at the N antennas from the number of UEs, the received reference signals having L symbols, L being smaller than N, for determining intermediate signals $\tilde{y}$, based on the uplink signals y, the channel estimation matrix $\hat{H}$ and the error estimation matrix Z, and for sending to the BBU 110 over the fronthaul link 140, the determined intermediate signals $\tilde{y}$.

According to an embodiment, the RRU is operative for the determining of the intermediate signals $\tilde{y}$ by multiplying the received incoming signal y with the transpose and conjugate $A^*$ of an extended channel matrix A, which is obtained based on the channel estimation matrix $\hat{H}$ and the error estimation matrix Z.

According to an embodiment, the RRU is operative for determining the error estimation matrix Z as $Z=1/\sqrt{L}[\hat{z}_1 \ldots \hat{z}_L]$, where $\hat{z}_l = y_{ref,l} - \hat{H}x_{ref,l}$ for $l=1, \ldots, L$, wherein $x_{ref,l}$ is the reference signals as sent from the UEs and $y_{ref,l}$ is the corresponding received reference signal.

According to another embodiment, the RRU is operative for decomposing the error estimation matrix Z into a first part matrix $G_R$ and a second part matrix $V_R$, and for obtaining the extended channel matrix A by combining the channel estimation matrix $\hat{H}$ and the first part matrix $G_R$, wherein the first part matrix $G_R$ composes of M column vectors and the second part matrix $V_R$ composes of M column vectors, M being smaller than L. Further, the RRU is operative for sending information of the second part matrix $V_R$ to the BBU.

According to another embodiment, the RRU is further operative for sending, to the BBU, information on the obtained channel estimation matrix $\hat{H}$ and the error estimation matrix Z.

According to another embodiment, the sent information on the obtained error estimation matrix Z and channel estimation matrix $\hat{H}$ is the coefficients of an extended channel matrix A, which is obtained based on the channel estimation matrix $\hat{H}$ and the error estimation matrix Z.

According to another embodiment, the RRU is further operative for determining an intermediate matrix I as $A^*A$, wherein A is an extended channel matrix A, which is obtained based on the channel estimation matrix $\hat{H}$ and the error estimation matrix Z, and $A^*$ is the transpose and conjugate of the extended channel matrix A. The RRU is operative for sending information on the obtained error estimation matrix Z and channel estimation matrix $\hat{H}$ by sending the coefficients of the intermediate matrix I.

According to other embodiments, the RRU 120 may further comprise a communication unit 602, which may be considered to comprise conventional means for wireless communication with the wireless communication devices 131, 132, 133, such as a transceiver for wireless transmission and reception of signals. The communication unit 602 may also comprise conventional means for communication with the BBU 110. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the RRU 120 to perform the steps described in any of the described embodiments of the RRU 120 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the RRU 120 has access via the communication unit 602. The computer program 605 may then be downloaded from the server into the memory 604.

Figure 12:
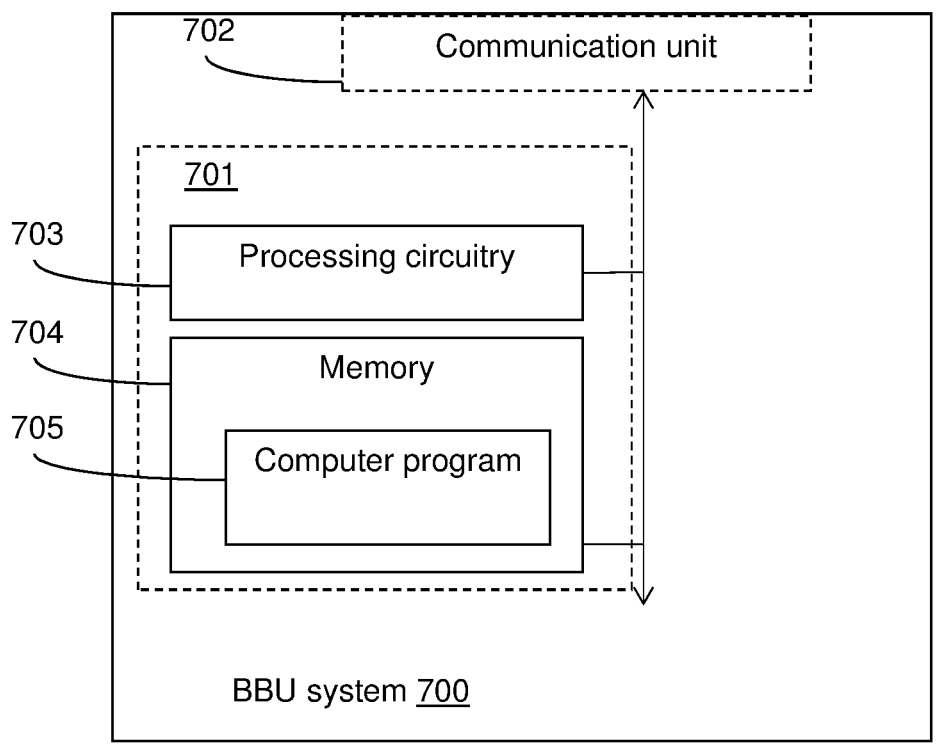
FIG. 12 is a block diagram illustrating a BBU system in more detail, according to further possible embodiments.

FIG. 12, in conjunction with FIG. 1, describes a BBU system 700 operable in a wireless communication network, the wireless communication network comprising a distributed base station system 100 having a BBU 110 and an RRU 120 connected to the BBU over a fronthaul link. The BBU system 700 comprises a processing circuitry 703 and a memory 704. Said memory contains instructions executable by said processing circuitry, whereby the BBU system 700 is operative for receiving, from the RRU 120, a plurality of intermediate signals ỹ with K+M components, where (K+M) is smaller than N, determined by the RRU based on a channel estimation matrix $\hat{H}$, on an error estimation matrix Z and on uplink signals y with N components as received by the N antennas 121, 122, 123 from a number of UEs 131, 132, 133, the uplink signals y comprising K user-layer signals overlaid with interference signals and noise, for determining an interference rejection matrix $W_K$ based on the channel estimation matrix $\hat{H}$ and on the error estimation matrix Z, and for determining an estimation r of the K user-layer signals by multiplying the intermediate signals ỹ with interference rejection coefficients of the interference rejection matrix $W_K$.

The BBU system 700 may be the actual BBU 110. Alternatively, the BBU system 700 may be any other network node of the communication network, such as a node further away from the UE, e.g. another network element in the RAN or close to the RAN or another RAN node. In this alternative, the BBU 110 receives from the RRU 120, the intermediate signals ỹ, and communicates the intermediate signals as well as other information it may receive from the RRU to the other network node which is arranged to perform the determining of the interference rejection matrix and the estimation of the user-layer signal. Alternatively, the BBU system may be a group of network nodes, wherein BBU functionality is spread out over different physical, or virtual, nodes of the network. The latter may be called a "cloud-solution"

According to an embodiment, the BBU system is operative for determining the interference rejection matrix $W_K$ as the first K rows of $(A^*A)^{-1}$, where A is an extended channel matrix obtained based on the channel estimation matrix $\hat{H}$ and the error estimation matrix Z, and $A^*$ is the transpose and conjugate of the extended channel matrix A.

According to another embodiment, the BBU system is further operative for receiving, from the RRU 120, information on the channel estimation matrix $\hat{H}$ and the error estimation matrix Z.

According to another embodiment, the BBU system is operative for determining the interference rejection matrix $W_K$ based on sent reference signals $x_{ref,l}$ sent by the UEs and received at the RRU, which reference signals were used for determining the channel estimation matrix $\hat{H}$ and the error estimation matrix Z at the RRU 120, the sent reference signals $x_{ref,l}$ being known by the BBU 110, and on intermediate reference signals $\tilde{y}_{ref,l}=A^*y_{ref,l}$, which corresponds to the sent reference signals $x_{ref,l}$ as received over the fronthaul link from the RRU.

According to another embodiment, the BBU system is operative for determining the interference rejection matrix $W_K$ by determining, based on the sent reference signals $x_{ref,l}$, $$\text{an intermediate matrix } I = A^*A = \begin{bmatrix} \hat{H}^*\hat{H} & \hat{H}^*Z \\ Z^*\hat{H} & Z^*Z \end{bmatrix},$$

where A is an extended channel matrix in which the channel estimation matrix $\hat{H}$ and the error estimation matrix Z are combined, $A^*$ is the transpose and conjugate of the extended channel matrix A, $\hat{H}^*$ is the transpose and conjugate of the channel estimation matrix $\hat{H}$ and $Z^*$ is the transpose and conjugate of the error estimation matrix Z, and for determining the first K rows of the inverse of the intermediate matrix I as the interference rejection matrix $W_K$.

According to another embodiment, the error estimation matrix Z is decomposed into a first part matrix $G_R$ and a second part matrix $V_R$, and the BBU system is operative for receiving, from the RRU 120, information on the second part matrix $V_R$, wherein Z is approximated at the RRU as the multiplication of the first part matrix $G_R$ and the transpose and conjugate of the second part matrix $V_R$, in which $G_R$ has M columns and $V_R$ has M columns.

According to another embodiment, the BBU system is further operative for receiving, from the RRU 120, information on the channel estimation matrix $\hat{H}$ and the first part matrix $G_R$.

According to another embodiment, the BBU system is operative for determining the interference rejection matrix $W_K$ based on sent reference signals $x_{ref,l}$ sent by the UEs and received at the RRU, which reference signals were used for determining the channel estimation matrix $\hat{H}$ and the error estimation matrix Z at the RRU (120), the sent reference signals $x_{ref,l}$ being known by the BBU (110), and on intermediate reference signals $\tilde{y}_{ref,l}=A^*y_{ref,l}$, which correspond to the sent reference signals $x_{ref,l}$ as received over the fronthaul link from the RRU, and on the second part matrix $V_R$ of the decomposition of the error estimation matrix Z.

According to other embodiments, the BBU system 700 may further comprise a communication unit 702, which may comprise conventional means for communication with the RRU 120, in case the BBU system 700 is the BBU 110, and also with the BBU 110 in case the BBU system 700 is another node in the network or is realized as a cloud-solution. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the BBU system 700 to perform the steps described in any of the described embodiments of the BBU system 700 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the BBU system 700 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." In the exemplary figures, a broken line generally signifies that the feature within the broken line is optional.

The invention claimed is:

1. A method performed by a remote radio unit, RRU, of a distributed base station system of a wireless communication network, the distributed base station system further comprising a base band unit, BBU, connected to the RRU over a fronthaul link, the RRU being connected to N antennas, the method comprising:

obtaining uplink signals y as received at the N antennas from a number of User Equipments (UEs) wirelessly connected to the RRU, the uplink signals comprising K user-layer signals overlaid with interference signals and noise;

obtaining a channel estimation matrix $\hat{H}$ of wireless communication channels H between the number UEs and the N antennas;

determining an error estimation matrix Z based on the obtained channel estimation matrix $\hat{H}$, and on received reference signals $y_{ref,l}$ as received at the N antennas from the number of UEs, the received reference signals having L symbols, L being smaller than N;

determining intermediate signals $\tilde{y}$, based on the uplink signals y, the channel estimation matrix $\hat{H}$ and the error estimation matrix Z, sending to the BBU over the fronthaul link, the determined intermediate signals $\tilde{y}$;

wherein the determining of the intermediate signals $\tilde{y}$ comprises multiplying the received incoming signal y with the transpose and conjugate $A^*$ of an extended channel matrix A, which is obtained based on the channel estimation matrix $\hat{H}$ and the error estimation matrix Z, wherein the error estimation matrix Z is decomposed into a first part matrix $G_R$ and a second part matrix $V_R$, and the extended channel matrix A is obtained by combining the channel estimation matrix $\hat{H}$ and the first part matrix $G_R$, wherein the first part matrix $G_R$ composes of M column vectors and the second part matrix $V_R$ composes of M column vectors, M being smaller than L, and the method further comprises:

sending information of the second part matrix $V_R$ to the BBU.

2. The method according to claim 1, wherein the error estimation matrix Z is determined as $Z=1/\sqrt{L}[\hat{z}_1 \ldots \hat{z}_L]$, where $\hat{z}_l=y_{ref,l}-\hat{H}x_{ref,l}$ for l=1, ..., L, wherein $x_{ref,l}$ is the reference signals as sent from the UEs and $y_{ref,l}$ is the corresponding received reference signal.

3. The method according to claim 1, wherein the error estimation matrix Z is approximated as a multiplication of the first part matrix $G_R$ and the transpose and conjugate of the second part matrix $V_R$, which are determined by performing a Singular Value Decomposition (SVD) on samples of the error estimation matrix Z.

4. The method according to claim 1, further comprising: sending, to the BBU, information on the obtained channel estimation matrix $\hat{H}$ and the error estimation matrix Z.

5. The method according to claim 4, wherein the sent information on the obtained error estimation matrix Z and channel estimation matrix $\hat{H}$ is the coefficients of an extended channel matrix A, which is obtained based on the channel estimation matrix $\hat{H}$ and the error estimation matrix Z.

6. The method according to claim 4, further comprising:

determining an intermediate matrix I as $A^*A$, wherein A is an extended channel matrix A, which is obtained based on the channel estimation matrix $\hat{H}$ and the error estimation matrix Z, and $A^*$ is the transpose and conjugate of the extended channel matrix A, and wherein the sent information on the obtained error estimation matrix Z and channel estimation matrix $\hat{H}$ is the coefficients of the intermediate matrix I.

7. A method performed by a BBU system of a wireless communication network, the wireless communication network comprising a distributed base station system having a BBU and an RRU connected to the BBU over a fronthaul link, the RRU having N antennas, the method comprising:

receiving, from the RRU, a plurality of intermediate signals $\tilde{y}$ with K+M components, where (K+M) is smaller than N, determined by the RRU based on a channel estimation matrix $\hat{H}$, on an error estimation matrix Z and on uplink signals y with N components as received by the N antennas from a number of UEs, the uplink signals y comprising K user-layer signals overlaid with interference signals and noise, determining an interference rejection matrix $W_K$ based on the channel estimation matrix $\hat{H}$ and on the error estimation matrix Z, determining an estimation r of the K user-layer signals by multiplying the intermediate signals $\tilde{y}$ with interference rejection coefficients of the interference rejection matrix $W_K$; and receiving, from the RRU, information on the channel estimation matrix $\hat{H}$ and the error estimation matrix Z, wherein the received information on the channel estimation matrix $\hat{H}$ and the error estimation matrix Z is coefficients of an intermediate matrix I determined as $A^*A$, where A is obtained based on the channel estimation matrix $\hat{H}$ and the error estimation matrix Z, and $A^*$ is the transpose and conjugate of the extended channel matrix A.

8. The method according to claim 7, wherein the interference rejection matrix $W_K$ is determined as the first K rows of $(A^*A)^{-1}$, where A is an extended channel matrix, which is obtained based on the channel estimation matrix $\hat{H}$ and the error estimation matrix Z and $A^*$ is the transpose and conjugate of the extended channel matrix A.

9. The method according to claim 7, wherein the received information on the channel estimation matrix $\hat{H}$ and the error estimation matrix Z is coefficients of an extended channel matrix A, which is obtained based on the channel estimation matrix $\hat{H}$ and the error estimation matrix Z.

10. The method according to claim 7, wherein the interference rejection matrix $W_K$ is determined based on sent reference signals $x_{ref,l}$ sent by the UEs and received at the RRU, which sent reference signals were used for determining the channel estimation matrix $\hat{H}$ and the error estimation matrix Z at the RRU, the sent reference signals $x_{ref,l}$ being known by the BBU, and on intermediate reference signals $\tilde{y}_{ref,l}=A^*y_{ref,l}$, which correspond to the sent reference signals $x_{ref,l}$ as received over the fronthaul link from the RRU.

11. The method according to claim 10, wherein the interference rejection matrix $W_K$ is determined by:
    determining, based on the sent reference signals $x_{ref,l}$, $$\text{an intermediate matrix } I = A^*A = \begin{bmatrix} \hat{H}^*\hat{H} & \hat{H}^*Z \\ Z^*\hat{H} & Z^*Z \end{bmatrix},$$

where A is an extended channel matrix in which the channel estimation matrix $\hat{H}$ and the error estimation matrix Z are combined, $A^*$ is the transpose and conjugate of the extended channel matrix A, $\hat{H}^*$ is the transpose and conjugate of the channel estimation matrix $\hat{H}$ and $Z^*$ is the transpose and conjugate of the error estimation matrix Z, and
        determining the first K rows of the inverse of the intermediate matrix I as the interference rejection matrix $W_K$.

12. The method according to claim 7, wherein the error estimation matrix Z is decomposed into a first part matrix $G_R$ and a second part matrix $V_R$, the method further comprising:
    receiving, from the RRU, information on the second part matrix $V_R$, wherein Z is approximated at the RRU as the multiplication of the first part matrix $G_R$ and the transpose and conjugate of the second part matrix $V_R$, in which $G_R$ has M columns and $V_R$ has M columns.

13. The method according to claim 12, wherein the M column vectors of $V_R$ are the right-singular vectors corresponding to the M largest singular values of the error estimation matrix Z, M being smaller than L, L being the number of symbols of a sent reference signal $x_{ref,l}$ used for determining the channel estimation matrix $\hat{H}$ and the error estimation matrix Z at the RRU, L being smaller than N, the first part matrix $G_R$ being used at the RRU for determining the intermediate signals $\tilde{y}$, and wherein the determining of the interference rejection matrix $W_K$ is based on the sent reference signals $x_{ref,l}$ and on the second part matrix $V_R$.

14. The method according to claim 12, wherein the interference rejection matrix $W_K$ is determined as the first K rows of $(A^*A)^{-1}$, where A is an extended channel matrix in which the channel estimation matrix $\hat{H}$ and the first part matrix $G_R$ are combined, and $A^*$ is the transpose and conjugate of the extended channel matrix A.

15. An RRU operable in a distributed base station system of a wireless communication network, the distributed base station system further comprising a base band unit, BBU, connected to the RRU over a fronthaul link, the RRU being connected to N antennas, the RRU comprising a processing circuitry and a memory, said memory containing instructions executable by said processing circuitry, whereby the RRU is operative for:
    obtaining uplink signals y as received at the N antennas from a number of User Equipments (UEs) wirelessly connected to the RRU, the uplink signals comprising K user-layer signals overlaid with interference signals and noise;
    obtaining a channel estimation matrix $\hat{H}$ of wireless communication channels H between the number UEs and the N antennas;
    determining an error estimation matrix Z based on the obtained channel estimation matrix $\hat{H}$, and on received reference signals $y_{ref,l}$ as received at the N antennas from the number of UEs, the received reference signals having L symbols, L being smaller than N;
    determining intermediate signals $\tilde{y}$, based on the uplink signals y, the channel estimation matrix $\hat{H}$ and the error estimation matrix Z, and
    sending to the BBU over the fronthaul link, the determined intermediate signals $\tilde{y}$;
    wherein the determining of the intermediate signals $\tilde{y}$ comprises multiplying the received incoming signal y with the transpose and conjugate $A^*$ of an extended channel matrix A, which is obtained based on the channel estimation matrix $\hat{H}$ and the error estimation matrix Z,
    wherein the error estimation matrix Z is decomposed into a first part matrix $G_R$ and a second part matrix $V_R$, and the extended channel matrix A is obtained by combining the channel estimation matrix $\hat{H}$ and the first part matrix $G_R$, wherein the first part matrix $G_R$ composes of M column vectors and the second part matrix $V_R$ composes of M column vectors, M being smaller than L, and wherein the RRU is further operative for:
    sending information of the second part matrix $V_R$ to the BBU.

16. A BBU system operable in a wireless communication network, the wireless communication network comprising a distributed base station system having a BBU and an RRU connected to the BBU over a front haul connection, the BBU system comprising a processing circuitry and a memory, said memory containing instructions executable by said processing circuitry, whereby the BBU system is operative for:
    receiving, from the RRU, a plurality of intermediate signals $\tilde{y}$ with K+M components, where (K+M) is smaller than N, determined by the RRU based on a channel estimation matrix $\hat{H}$, on an error estimation matrix Z and on uplink signals y with N components as received by the N antennas from a number of UEs, the uplink signals y comprising K user-layer signals overlaid with interference signals and noise,
    determining an interference rejection matrix $W_K$ based on the channel estimation matrix $\hat{H}$ and on the error estimation matrix Z, and
    determining an estimation r of the K user-layer signals by multiplying the intermediate signals $\tilde{y}$ with interference rejection coefficients of the interference rejection matrix $W_K$; and
    receiving, from the RRU, information on the channel estimation matrix $\hat{H}$ and the error estimation matrix Z, wherein the received information on the channel estimation matrix $\hat{H}$ and the error estimation matrix Z is coefficients of an intermediate matrix I determined as $A^*A$, where A is obtained based on the channel estimation matrix $\hat{H}$ and the error estimation matrix Z, and $A^*$ is the transpose and conjugate of the extended channel matrix A.

* * * * *